(12) United States Patent
Ikeda

(10) Patent No.: US 10,689,272 B2
(45) Date of Patent: Jun. 23, 2020

(54) CAPACITIVE DEIONISATION

(71) Applicant: Fujifilm Manufacturing Europe B.V., Tilburg (NL)

(72) Inventor: Morihito Ikeda, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 154 days.

(21) Appl. No.: 16/082,666

(22) PCT Filed: Mar. 2, 2017

(86) PCT No.: PCT/GB2017/050556
§ 371 (c)(1),
(2) Date: Sep. 6, 2018

(87) PCT Pub. No.: WO2017/153716
PCT Pub. Date: Sep. 14, 2017

(65) Prior Publication Data
US 2019/0071329 A1 Mar. 7, 2019

(30) Foreign Application Priority Data

Mar. 7, 2016 (GB) .................................. 1603889.5

(51) Int. Cl.
*C02F 1/46* (2006.01)
*C02F 1/469* (2006.01)
(Continued)

(52) U.S. Cl.
CPC .......... *C02F 1/4691* (2013.01); *C02F 1/4693* (2013.01); *C02F 1/4695* (2013.01);
(Continued)

(58) Field of Classification Search
CPC .. C02F 1/4691; C02F 1/4693; C02F 1/46109; C02F 1/4695; C02F 2001/46138;
(Continued)

(56) References Cited

U.S. PATENT DOCUMENTS 6,709,560 B2   3/2004   Andelman et al.
8,357,288 B2   1/2013   Noh et al.
(Continued)

FOREIGN PATENT DOCUMENTS

EP   2980027 A1   2/2016
EP   3026023 A1   6/2016
(Continued)

OTHER PUBLICATIONS

Lee, Jae-Hun, et al., "The production of ultrapure water by membrane capacitive deionization (MCDI) technology", Journal of Membrane Science, vol. 409, 2012, pp. 251-256.

*Primary Examiner* — Arun S Phasge
(74) *Attorney, Agent, or Firm* — Banner & Witcoff, Ltd.

(57) ABSTRACT

An electrode unit comprising: (a) an electrically non-conductive circumferential housing; (b) a current collector; (c) an electrode; (d) optionally a charge barrier; and (e) an electrically conductive connector in electrical contact with the current collector (b); wherein (b), (c) and (d) (when present) are located within the circumference of the circumferential housing (a); the main plane of the part of (e) which is located within the housing (a) is substantially parallel to the main plane of (b), (e) extends beyond the housing (a); and the area of the part of (e) which is located within the housing (a) is less than 30% of the area of (b). Also claimed are stacks, composites devices and their uses.

30 Claims, 8 Drawing Sheets

*Invention*

(51) Int. Cl.
   *C02F 1/461*     (2006.01)
   *C02F 103/08*    (2006.01)
(52) U.S. Cl.
   CPC ............... *C02F 1/46109* (2013.01); *C02F 2001/46138* (2013.01); *C02F 2103/08* (2013.01); *C02F 2201/004* (2013.01); *C02F 2201/46115* (2013.01)
(58) Field of Classification Search
   CPC ........ C02F 2103/08; C02F 2201/46115; C02F 2201/004
   See application file for complete search history.

(56) References Cited

U.S. PATENT DOCUMENTS

| | | |
|---|---|---|
| 9,890,065 B2 | 2/2018 | Servida |
| 2004/0121204 A1 | 6/2004 | Adelman et al. |
| 2009/0218227 A1 | 9/2009 | Noh et al. |
| 2009/0223825 A1 | 9/2009 | Lee et al. |
| 2011/0042205 A1* | 2/2011 | Kim ............... C02F 1/4691 204/252 |
| 2013/0153423 A1 | 6/2013 | Van Der Wal et al. |
| 2013/0153426 A1 | 6/2013 | Sun et al. |
| 2014/0238862 A1 | 8/2014 | Van Der Wal et al. |
| 2016/0229717 A1 | 8/2016 | Servida |
| 2016/0355418 A1 | 12/2016 | Lee et al. |

FOREIGN PATENT DOCUMENTS

| | | |
|---|---|---|
| WO | 2015052574 A1 | 4/2015 |
| WO | 2015/099320 A1 | 7/2015 |

\* cited by examiner

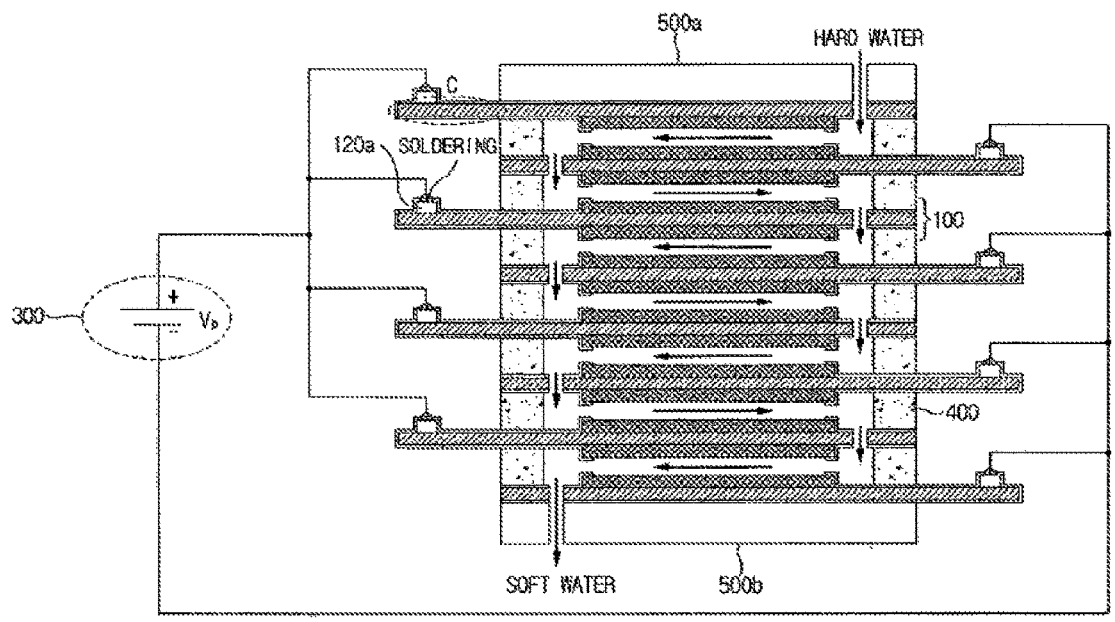
Fig. 1 - Prior Art
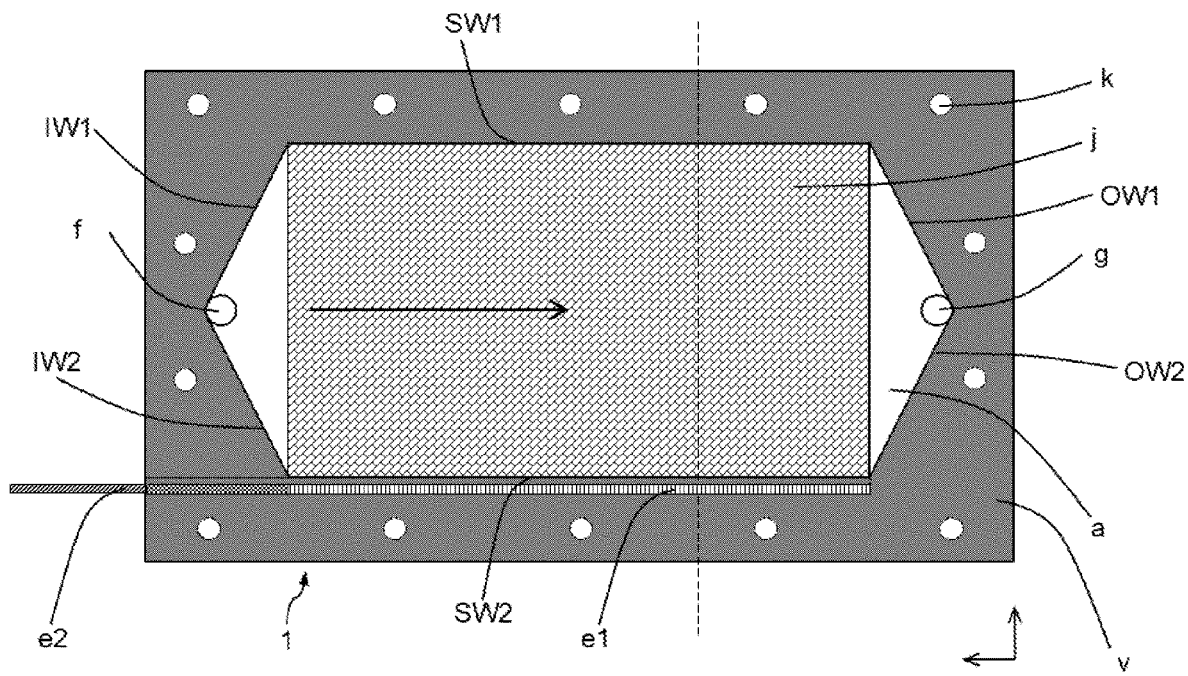
Fig. 2 - Invention

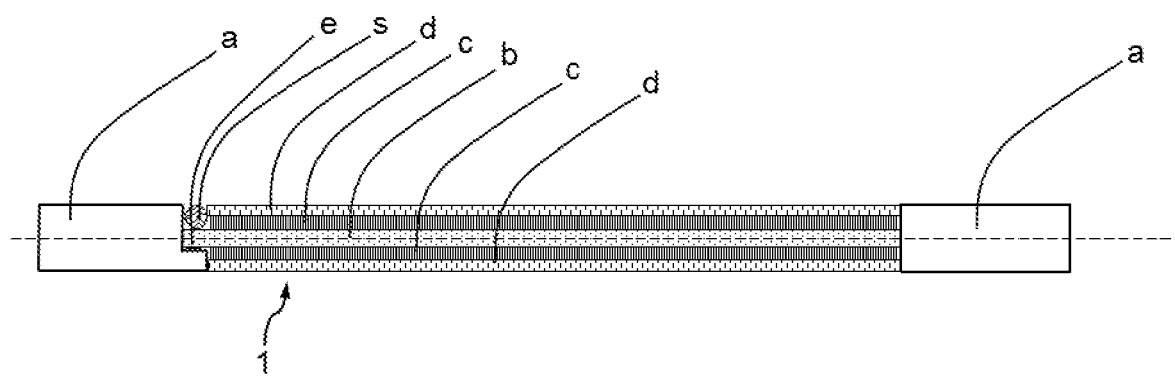
Fig. 3a - Invention
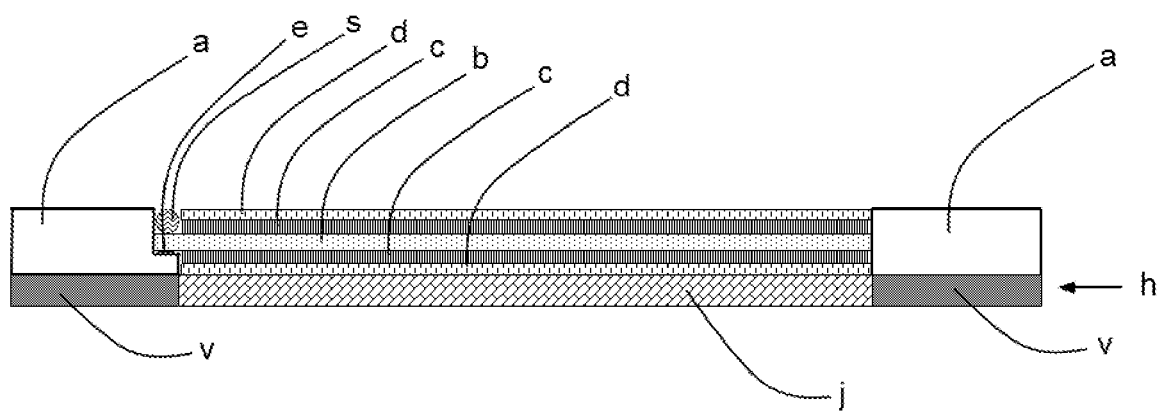
Fig. 3b - Invention

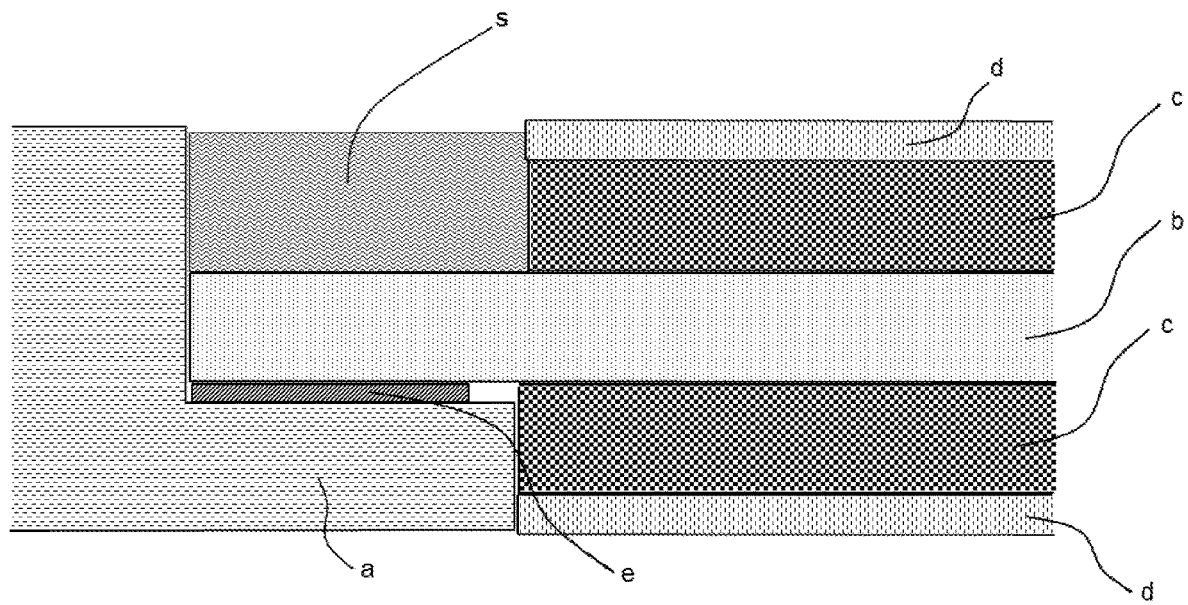
Fig. 4 – Invention
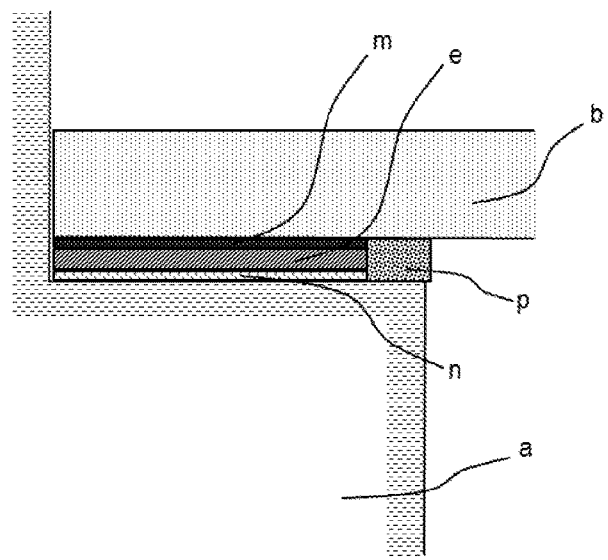
Fig. 5 – Invention

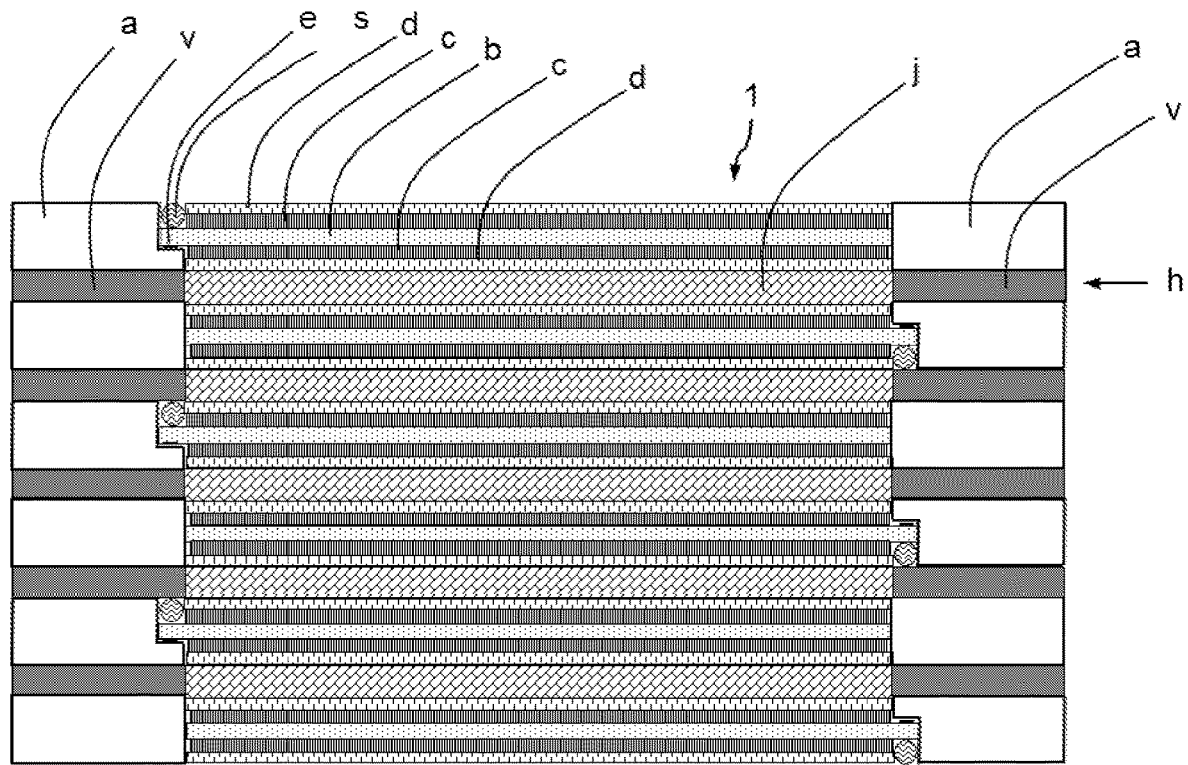
Fig. 6 – Invention

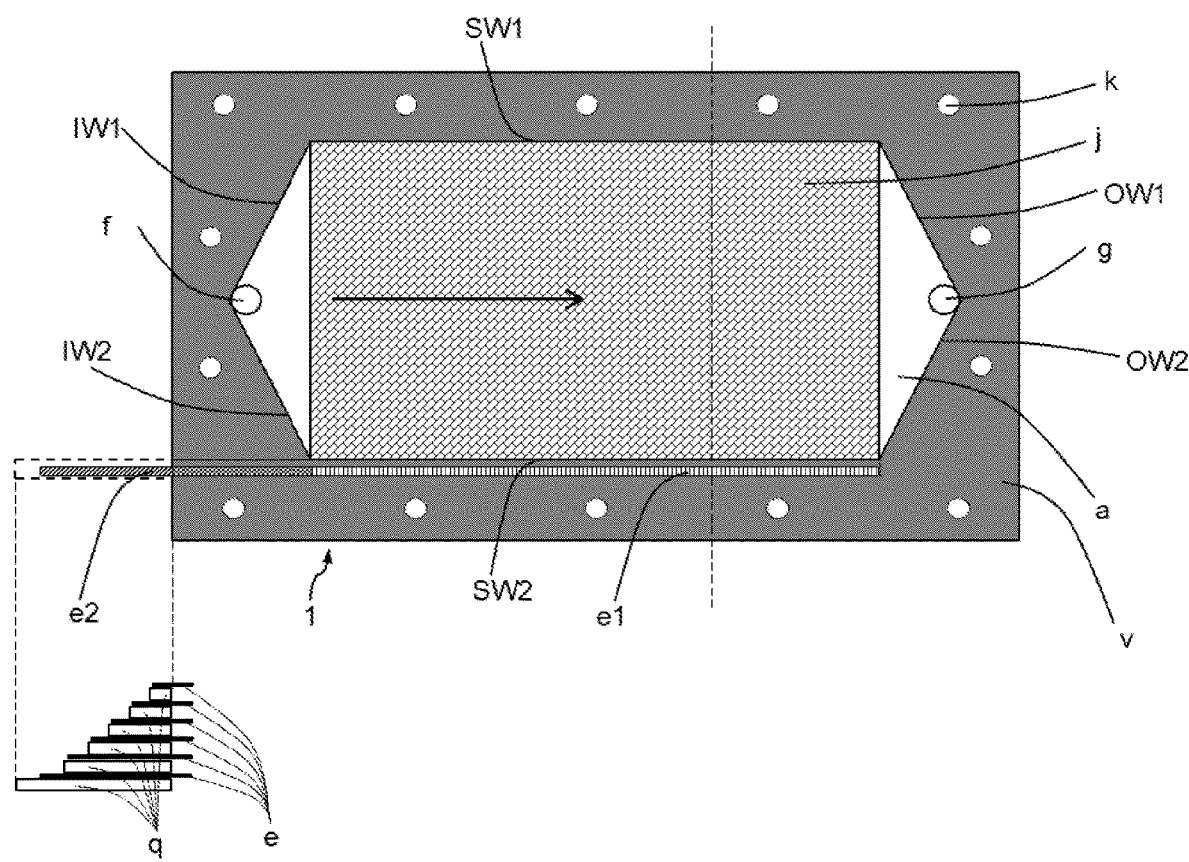
Fig. 7 – Invention

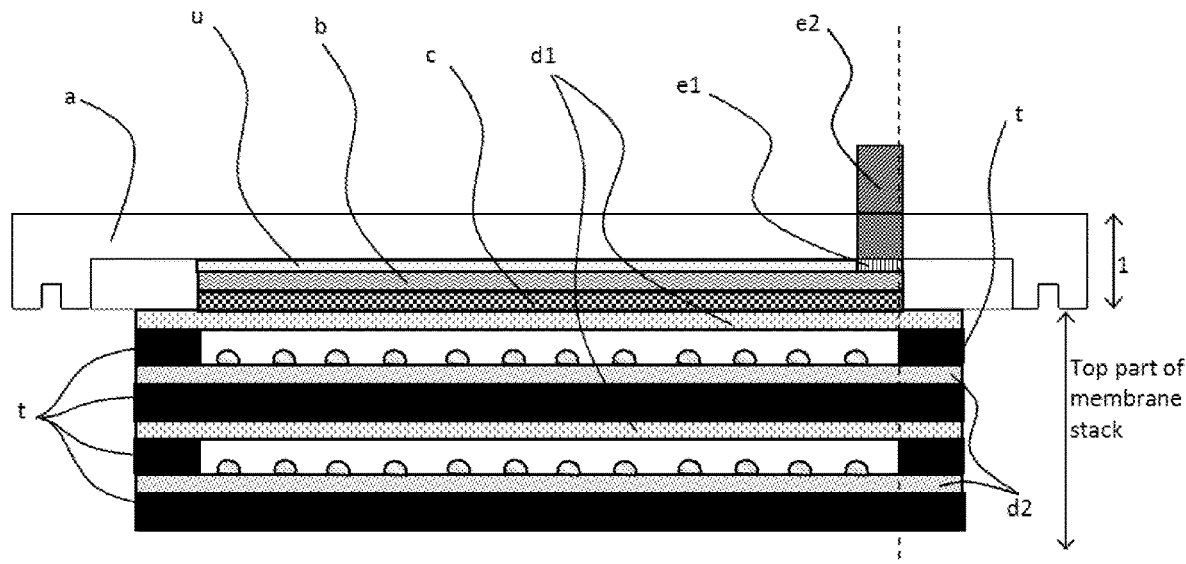
Fig. 8a – Invention
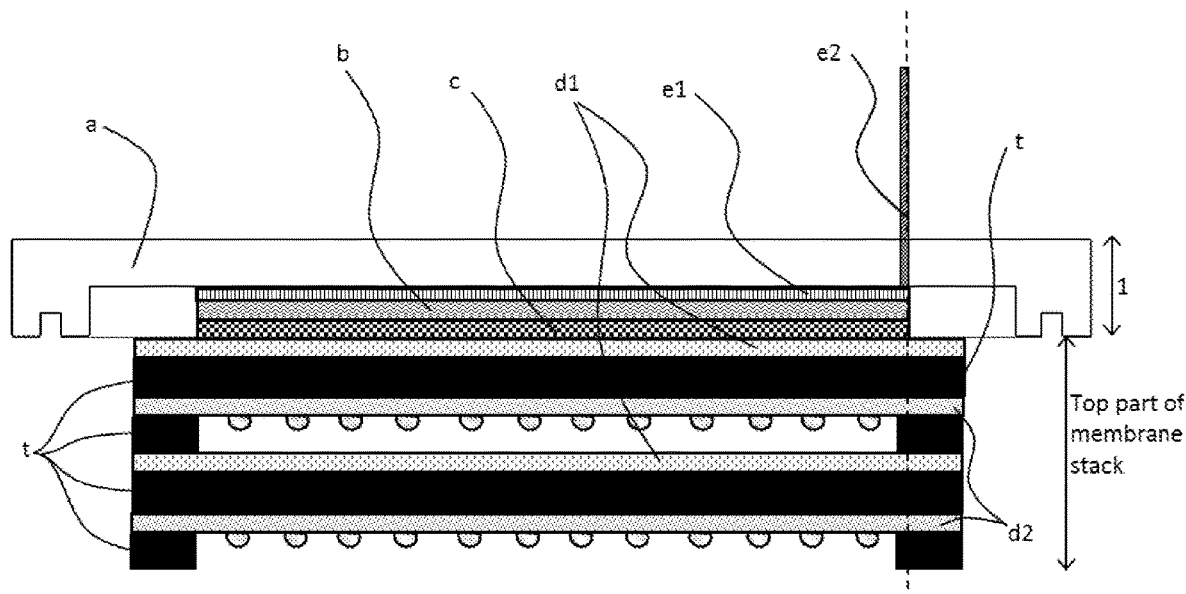
Fig. 8b – Invention

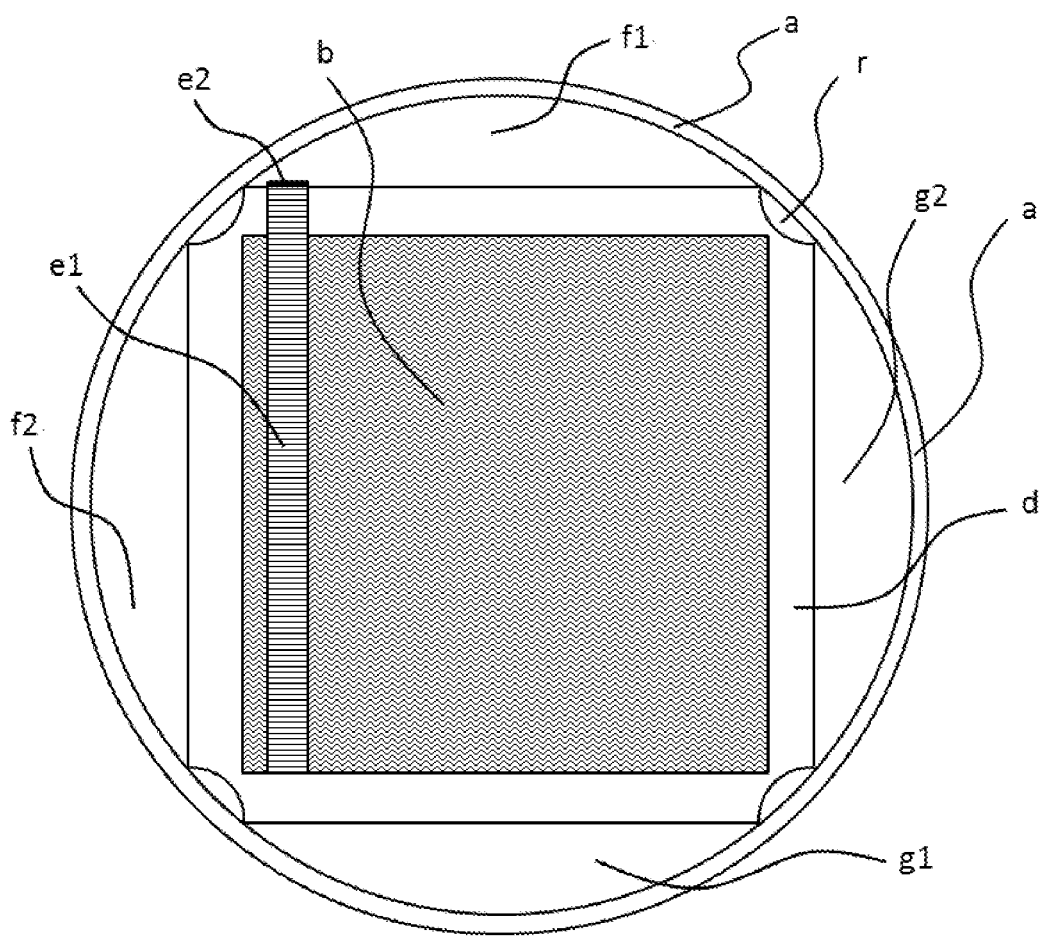
*Fig. 9 – Invention*
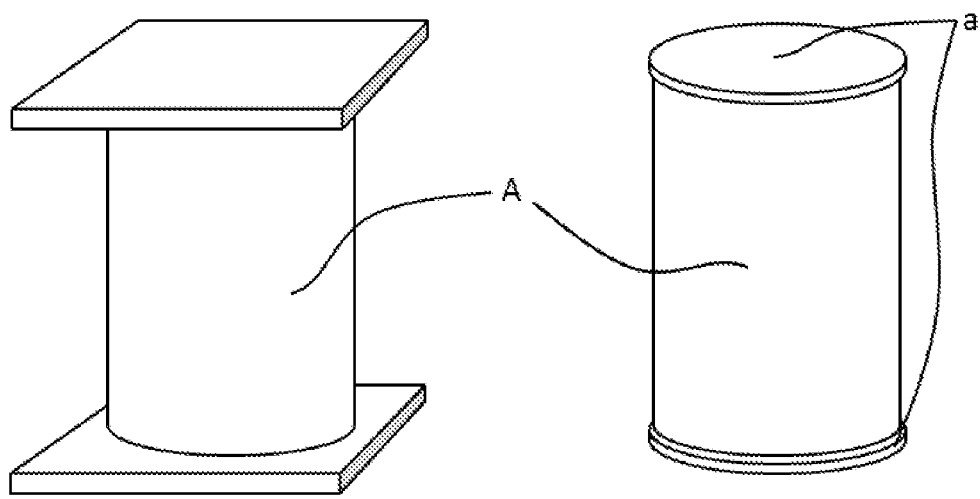
*Fig. 10 – Invention*

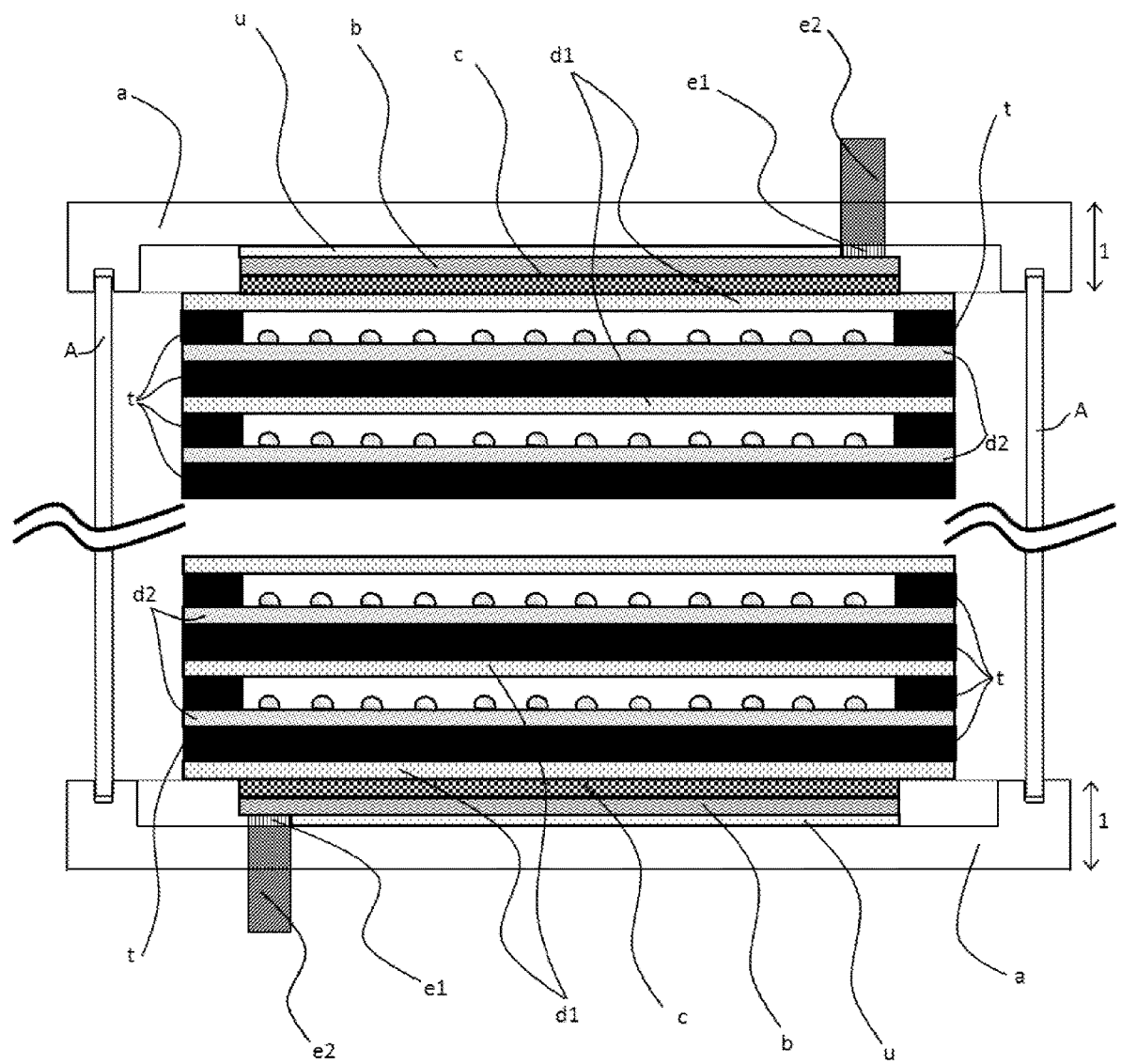
Fig. 11 – Invention

CAPACITIVE DEIONISATION

RELATED APPLICATIONS

This application is a National Stage Application under 35 U.S.C. 371 of co-pending PCT application PCT/GB2017/050556 designating the United States and filed Mar. 2, 2017; which claims the benefit of GB application number 1603889.5 and filed Mar. 7, 2016 each of which are hereby incorporated by reference in their entireties.

This invention relates to electrode units and electrode-spacer composites, to stacks and devices comprising such electrode units and/or electrode-spacer composites and to uses of the foregoing.

It is known to desalinate salt water by a process called capacitive deionization. The capacitive deionization process comprises passing salt water between a pair of electrodes of large surface area, each electrode being in electrical contact with a power supply via a current collector. When a DC voltage is applied across the electrodes, positive ions (e.g. $Na^+$ ions) migrate to the electrode connected to the negative electrode of the power supply and negative ions (e.g. $Cl^-$ ions) migrate to the electrode connected to the positive electrode of the power supply. The ions are then bound to the electrodes. From time to time, the stored ions are removed from the electrodes by a regeneration process which typically comprises reversing the polarity of the electrodes to dispel the ions from the electrodes. Typically, in conventional CDI devices, the electrodes are in the form of flat plates or sheets comprising e.g. activated carbon. Salt water flows through a compartment between the electrodes and ions present in the salt water are attracted to the appropriate electrode by electrostatic forces. Thus, the ions are adsorbed onto the electrodes from the passing salty water.

US 2009/0223825 ('825) describes a known CDI device and acknowledges the problem that graphite current collectors which extend outside of CDI devices are easily broken. '825 addresses this problem by integrally bonding the current collector and electrodes using a protective film made from insulation material, e.g. from a polyimide film.

WO2008/030646 describes an ionic species removal system comprising a power supply, a pump for transporting a liquid through the system and a plurality of porous electrodes, each comprising an electrically conductive porous portion.

In U.S. Pat. No. 6,709,560 Andelman et al. introduced the idea of including a charge-barrier in CDI devices, e.g. an ion exchange membrane, to improve the ion removal efficiency of the CDI device. WO2015/052574 describes a CDI device comprising a current collector constructed from a graphite sheet which extends outside of the body of the CDI device where it connects to an external power supply. However graphite is not very robust and as acknowledged in '825 the part which extends outside of the device tends to break easily.

When metals are used as current collector the CDI devices often have a short lifetime, due to galvanic corrosion caused by contact between the metal and the carbon electrode in the presence of fluid containing ions. An aluminum current collector corrodes very fast but also a copper current collector corrodes severely. The sensitivity for galvanic corrosion of metals in contact with carbon occurs because carbon is exceptionally noble, even more so than gold and platinum.

Electrodialysis devices for desalination and reverse electrodialysis devices for generating electricity are also known.

Thus there is a need for electrode units, electrode-spacer composites, stacks and devices comprising electrode units and/or electrode-spacer composites which have good lifetimes without excessive corrosion and do not suffer from the problem of the current collector breaking easily.

According to a first aspect of the present invention there is provided an electrode unit comprising:
  (a) an electrically non-conductive circumferential housing;
  (b) a current collector;
  (c) an electrode;
  (d) optionally a charge barrier; and
  (e) an electrically conductive connector in electrical contact with the current collector (b);
wherein:
  (i) the current collector (b), the electrode (c), the charge barrier (d), when the charge barrier (d) is present, and a part of the electrically conductive connector (e) are located within the circumference of the circumferential housing (a);
  (ii) the part of the connector (e) which is located within the housing (a) and the current collector (b) each have a main plane and the main plane of the connector (e) is oriented substantially parallel to the main plane of the current collector (b);
  (iii) the connector (e) extends beyond the housing (a); and
  (iv) the major cross-sectional area of the part of the connector (e) which is inside the housing (a) is less than 30% of the major cross-sectional area of the current collector (b).

By locating the current collector (b) within the circumference of the circumferential housing (a) the problem of the current collector 'snapping' is avoided. Instead, if desired, one may use a more robust electrically conductive connector (e) which extends from within the circumference of the circumferential housing (a) to outside the circumference of the circumferential housing (a) where the connector may make contact with a power source. Thus the current collector (b) and the connector (e) are different parts of the electrode unit, i.e. the current collector (b) and the connector (e) are not the same component of the electrode unit of the present invention. The electrode unit (1) of the present invention is particularly useful for a capacitive deionisation device and for other devices comprising an electrode unit, e.g. electrodialysis and reverse electrodialysis devices.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, components and/or groups, but do not preclude the presence or addition of one or more other features, regions, integers, steps, operations, elements, components, and/or groups thereof.

Furthermore, relative terms, such as "side", "top", "bottom", "above", "below" and "on" are used herein to describe one element's relationship to other elements and are not absolute. It will be understood that relative terms are intended to encompass different orientations of the unit and device in addition to the orientation depicted in the Figures. For example, if a device according to the present invention is turned over by 90 degrees, elements described as the "side wall" of a compartment would still remain as a "side wall" even though such a wall then runs horizontally and is higher than what was previously regarded as the "top" or "bottom" of that compartment.

For brevity, in this specification the electrically conductive connector in electrical contact with the current collector is often abbreviated simply to "the connector".

In this specification the major cross-sectional area of an element is the largest cross-sectional area of any part of that element parallel to a surface of that element. The main plane of an element is the plane through that element having the greatest cross-sectional area.

The electrically non-conductive circumferential housing typically has a major cross-sectional area which is larger than the current collector (b), the electrode (c), the charge barrier (d) (when present), and the part of the electrically conductive connector (e) which it encloses. Optionally the housing is open on one or two sides, as illustrated in FIGS. 2, 3a, 3b, 8a, 8b and 11.

As used herein the term electrodialysis or ED also includes specific applications thereof such as electrodialysis reversal (EDR) and reverse electrodialysis (RED). Thus in this specification the term "ED stack" includes electrodialysis stacks, reverse electrodialysis stacks and stacks for electrodialysis reversal and the term "ED device" includes electrodialysis devices, reverse electrodialysis devices and devices for electrodialysis reversal unless the context requires otherwise.

BRIEF DESCRIPTION OF THE DRAWINGS

The present invention will be discussed in more detail below, using a number of exemplary embodiments, with reference to the attached drawings, in which:

FIG. 1—Prior Art—is a schematic, cross-sectional view through a prior art CDI device comprising a number of electrode units in which the current collectors extend outside of the circumference of the circumferential housing.

FIG. 2 illustrates a section through gasket (v) and an electrode unit (1) according to the present invention.

FIG. 3a illustrates a section through the electrode unit (1) according to the present invention.

FIG. 3b illustrates a section through the electrode unit (1) and spacer shown in FIG. 2 along the dotted line shown in FIG. 2.

FIG. 4 is an enlarged view of part of the left hand side of FIG. 3a.

FIG. 5 illustrates a section through the side of an electrode unit (1) according to the present invention in which the various components can be seen more easily.

FIG. 6 illustrates a stack according to the present invention.

FIG. 7 is identical to FIG. 2 except that it includes a sideways projection to show optional supports for the connector (e).

FIGS. 8a and 8b schematically illustrate a vertical section through one end of an ED or RED stack (e.g. the top part) according to the present invention. The dotted line in FIG. 8a shows the section along which FIG. 8b is drawn and vice versa.

FIG. 9 illustrates a combination of a projection and a horizontal section through an electrode unit according to the present invention in order to show several layers on top of each other.

FIG. 10 schematically illustrates a perspective view of two ED devices according to sixth aspect of the present invention.

FIG. 11 shows a vertical section through an ED device according to the present invention.

DETAILED DESCRIPTION

FIG. 1—Prior Art—is a schematic, cross-sectional view through a prior art CDI device comprising a number of electrode units (100). The CDI device comprises a top wall (500a), a bottom wall (500b) and non-conductive side wall separators (400) which keep the electrode units (100) a desired distance apart. Hard water having a high ionic concentration enters the top of the CDI device and follows the path shown by the arrows, exiting the CDI device as soft water at the bottom of the device. The electrode units (100) each comprise a graphite current collector which extends beyond the circumference of the circumferential housing (500a, 400, 500b, 400) where it connects via contact 120a located outside of the housing with an external power supply (300). Each current collector extends outside of the stack and is in direct contact with an electrode on each side, shown in darker shading in FIG. 1. Furthermore the current collector and electrodes are integrally bonded together using a protective film and optionally a conductive binder.

FIG. 2 represents a section through the gasket (v) and an electrode unit (1) according to the present invention (which is suitable for use in a CDI device). The section shows a rectangular, circumferential gasket (v) having a hexagonal central portion cut away to create, in this case, a hexagonal flow compartment. The hexagonal flow compartment has inlet end walls (IW1) and (IW2) at the inlet end, outlet end walls (OW1) and (OW2) at the outlet end, side wall (SW1) which joins inlet end wall (IW1) and outlet end wall (OW1) and side wall (SW2) which joins inlet end wall (IW2) and outlet end wall (OW2). The hexagonal flow compartment comprises a rectangular fluid-permeable spacer element (j). The area of the hexagonal central portion cut away from the gasket (v) which is not occupied by the fluid-permeable spacer element (j) reveals a part of the electrically non-conductive circumferential housing (a) below and the fluid inlet (f) and fluid outlet (g). Only a part of the electrically non-conductive circumferential housing (a) is visible in FIG. 2 because the fluid-permeable spacer element (j) and the gasket (v) obscure the view of most of the housing (a). However the electrically non-conductive circumferential housing (a) is approximately the same shape as the gasket (v), as can be seen more easily in FIG. 3a and FIG. 3b. Fourteen openings (k) through the gasket (v) and the underlying housing (a) can receive bolts (not shown) to attach multiple electrode units (1) and spacers (h) together to form a stack. Although the electrically conductive connector (e) would not normally be visible in this particular cross-section (because it is in a plane below the spacer element (j)) we have shown the connector (e) in FIG. 2 purely to assist with the understanding of the invention. The feint line that runs above and parallel to the edge of connector (e) represents the top of a slot into which connector (e) fits. Furthermore, the main plane of connector (e) is oriented substantially parallel to the main plane of the current collector (b). The main plane of the current collector (b) (and of connector (e)) is indicated in FIG. 2 by the arrows at the right bottom side.

FIG. 3a illustrates a section through the electrode unit (1) of the present invention which is suitable for use in a CDI device. In this section one can see that the current collector (b), the electrodes (c) and the charge barriers (d) are all located within the circumference of the circumferential housing (a). The connector (e) extends (upwards and out of the page towards the viewer) beyond the housing (a). On the side of the current collector (b) opposite the connector (e) optional sealant (s) is shown. The section cuts through the main plane of connector (e) and the main plane of the current collector (b) and one can see that these two main planes are oriented substantially parallel to each other. A dotted line indicates the horizontal plane of the major cross sectional area of the current collector (b) and the major cross sectional area of the electrically conductive connector (e) runs parallel to and just below this dotted line.

FIG. 3b illustrates a section through the electrode unit and spacer shown in FIG. 2 along the dotted line shown in FIG. 2. The component parts are as described for FIG. 3a and in addition one can see the spacer (h) comprising gasket (v) and fluid-permeable spacer element (j). Thus FIG. 3 illustrates an electrode-spacer composite according to the second aspect of the present invention.

FIG. 4 represents an enlargement of the left hand side of FIG. 3a. One can see the edge of the circumferential housing (a), the current collector (b), the electrodes (c) and the charge barriers (d). The connector (e) is in physical contact with (and therefore in electrical contact with) the current collector (b) and optionally there is a protective glue (not shown) around the connector (e) in order to prevent fluid passing through the CDI device from coming into contact with the connector (e) and thereby avoid corrosion. In this enlargement one can more easily see that the main plane of connector (e) is oriented substantially parallel to the main plane of the current collector (b). Optional sealant (s) is shown on the side of the current collector (b) opposite the connector (e).

FIG. 5 represents an alternative embodiment showing the junction at the left hand side of FIG. 3a, enlarged to show the housing (a), current collector (b) and the electrically conductive connector (e). In addition, this drawing shows the presence of an electrically conductive adhesive (m), a protective coating or film (n) and an additional sealant (p) to ensure that fluid passing through the CDI device cannot come into contact with the connector (e) and cause galvanic corrosion. Again in this enlargement one can see that the main plane of connector (e) is oriented substantially parallel to the main plane of the current collector (b).

FIG. 6 illustrates a section through a stack which is suitable for use in a CDI device according to the present invention (sometimes herein referred to simply as a "CDI stack") comprising six electrode units (1) and a spacer (h) between each electrode unit (1) and the next which defines the side walls and end walls of five flow compartments through which fluid may flow. In this embodiment, the electrode units (1) each comprise a charge barrier (d). In the CDI stack of FIG. 6, the order of electrode units (1) throughout the stack is alternately anode then cathode. The top and bottom of each flow compartment is delimited by charge barriers (d) of adjacent electrode units (1). Furthermore, for each flow compartment, the charge barrier (d) which delimits the top of that compartment has opposite ionic permeability and opposite ionic impermeability to the charge barrier (d) which delimits the bottom of that compartment. In FIG. 6 the features (a), (b), (c), (d), (e), (h), (v), (j) and (s) have the same meaning as that described above in relation to the other drawings.

FIG. 7 is identical to FIG. 2 except that it includes a sideways projection to show optional supports (q) for the part (e2) of the electrically conducting connectors (e) that extend beyond the housing (a).

FIG. 8a and FIG. 8b schematically illustrate a vertical section through one end of an ED stack (e.g. the top part) according to the fourth aspect of the present invention, viewed in different directions. The ED stack comprises an electrode unit (1) indicated by the double-headed arrow labeled "1" and a membrane stack below the electrode unit (1). As can be seen, the electrode unit (1) in FIGS. 8a and 8b does not comprise a charge barrier (d). Instead the charge barriers (d1) and (d2) (which are oppositely charged) are part of the membrane stack shown below the electrode unit (1). The electrode unit (1) further comprises a current collector (b), an electrode (c) and an isolation or adhesive layer (u) which connects the current collector (b) with the housing (a). The ED stack comprises a number of ion diluting and ion concentrating compartments defined by the charge barriers (d1, d2) and the side walls (t). Typically charge barrier (d1) is a cation exchange membrane and charge barrier (d2) is an anion exchange membrane and the anion exchange membranes and cation exchange membranes alternate throughout the membrane stack. Sidewalls (t) may be formed from an adhesive or one may use a polymeric gasket as side wall (t). FIGS. 8a and 8b show sections (indicated by dotted lines) through two adjacent sides of a cuboid-shaped stack. FIG. 8a shows two flow compartments which allow a direction of flow in a first direction towards or away from the viewer (e.g. ion diluting compartments), while compartments which allows liquid to flow from left to right (e.g. ion concentrating compartments) is obscured by the horizontal side walls (t) which extend across the full width of the ED stack in FIG. 8a. FIG. 8b. is the same ED stack as that shown in FIG. 8a and has exactly the same parts but has been rotated by 90 degrees to show the compartments which were hidden by the horizontal side walls (t) in FIG. 8a (and obscure the compartments that were visible in FIG. 8a).

FIGS. 8a and 8b also show the orientation of the electrically conductive connector (e) (comprising parts (e1) and (e2)) relative to the ED stack. The electrically conductive connector (e) does not need to be in the same plane as the side walls (t) but are shown so in the drawings for clarity reasons (several elements are projected to show their spatial relationship and need not be all in the same plane). Current collector (b) and electrode (c) are located entirely within the circumference of housing (a). FIG. 8b in particular clearly shows from sections through the current collector (b) and the part of the electrically conductive connector (e) which is inside the housing (a), i.e. part (e1), that the main plane of the part (e1) of the electrically conductive connector (e) is oriented substantially parallel to the main plane of the current collector (b). Current collector (b) may be, if desired, directly adjacent the housing (a) or optionally the stack further comprises the isolation or adhesive layer (u) located between the current collector (b) and the housing (a). When the optional isolation or adhesive layer (u) is not present the connector (e) may cause a slight deformation of the electrode units within the stack which can (partly) be cushioned by the electrode (c). If desired one may use an electrically conductive adhesive to connect part (e1) of the electrically conductive connector (e) to the current collector (b) (not shown), e.g. an electrically conductive adhesive may be applied parallel to one edge of the current collector (b).

In FIGS. 8a and 8b the electrically conductive connector (e) is bent in an angle of 90° at one end and part (e2) of the connector (e) extends beyond the housing (a). Thus, in contrast to the current collector (b) and electrode (c), the electrically conductive connector (e) is not located entirely within the housing (a): part (e2) of the electrically conductive connector (e) extends beyond the housing (a). The charge barriers (d2) shown in FIGS. 8a and 8b are profiled at both sides, although the profile of only one side can be seen in FIGS. 8a and 8b due to the sidewall (t) obscuring the view of alternate compartments. The profiled charge barriers (d1 and d2) (i.e. the presence of protrusions on the charge barriers (d1 and d2)) eliminate the need for the membrane stack to comprise fluid-permeable spacer elements. Optionally (not shown) the electrode (c) and current collector (b)

are sealed at all four sides to prevent feed liquid from coming in direct contact with the electrode (c) and the current collector (b).

FIG. 9 represents a combination of a projection and a horizontal section through an electrode unit (1) according to the present invention in order to show several layers on top of each other. The electrically conductive connector (e) has two parts, namely part (e1) which sits on the current collector (b) and part (e2) which extends upwards at an angle of 90 degrees, through and beyond the top part of the housing (a). The charge barrier (d) has corner recessions (r). In this embodiment the charge barrier (b) is part of the membrane stack and not part of the electrode unit (1). The electrode (c) is located between the current collector (b) and the charge barrier (d) and therefore not visible. Fluid inlets (f) and fluid outlets (g) are indicated by (f1), (f2), (g1) and (g2).

FIG. 10 is a perspective view of two ED devices according to the sixth aspect of the present the invention showing the non-conductive outer casing (A). Inside the outer casing (A) there is at least one ED stack according to the fourth aspect of the present invention. The contents of the outer casing (A) are not visible and the fluid inlets (f) and fluid outlets (g) are not shown.

In one embodiment the circumferential housing (a) of the electrode units is provided by a part of the non-conductive outer casing (A).

FIG. 11 schematically illustrates a vertical section through an ED stack according to the fourth aspect of the present invention. Only the top and bottom parts of the ED stack are shown. The ED stack comprises two electrode units (1) according to the first aspect of the present invention and, located between the two electrode units (1), a membrane stack comprising alternate cation exchange membranes and anion exchange membranes running parallel to the main plane of the electrode units (1) and flow compartments between said membranes through which fluid may flow. The parts (a), (b), (c), (d), (e1), (e2), (u), (t), (d1), (d2) and (A) are as described above in relation to the other drawings.

Preferably the outer casing (A) is electrically non-conductive. The electrically non-conductive circumferential housing (a) and the outer casing (A) may be prepared from any material which does not conduct electricity. For example, the housing (a) and/or outer casing (A) may be constructed from a strong plastics material e.g. reinforced polyester, polyethyleneterephthalate, polyethylene naphthalate, polybutylene terephthalate, epoxy resin, polytrimethylene terephthalate, polycarbonate, polymethyl methacrylate, polyolefin (e.g. polyethylene or polypropylene). As reinforcement one may use, for example, fibreglass, carbon fibre, aramid fibre or a combination comprising two or more thereof.

The electrically conductive connector (e) extends beyond the housing (a) and is in electrical contact with the current collector (b) in a plane parallel to the current collector (b), either directly or indirectly, so that current from an external power source can be used to attract ions to the electrode (c). Electrode (c) is in electrical contact with current collector (b). The current collector (b) and the electrode (c) are located entirely within the circumference of the circumferential housing (a). Inside the housing (a) the part (e1) of the connector (e) is preferably oriented in a plane parallel to the current collector (b) to enhance the electrical contact therebetween. The part (e2) of the connector (e) which extends beyond the housing (a) may have any orientation relative to the electrode (c). In addition there are one or more electrodes (c) present within the circumference of the circumferential housing (a).

The current collector (b) preferably comprises a material selected from nickel, carbon (e.g. graphite), titanium, aluminum, stainless steel, copper, silver, gold, platinum and combinations comprising two or more thereof, including alloys and multilayer foils.

Preferably the current collector (b) has a different chemical composition to the electrically conductive connector (e), for example the electrically conductive connector (e) preferably has a lower volume resistivity than the current collector (b).

Preferably the current collector (b) comprises mainly carbon, e.g. the current collector (b) preferably is or comprises graphite, graphene and/or carbon nanotubes.

The thickness of the current collector (b) is preferably between 1 and 500 μm, more preferably between 5 and 400 μm, especially between 10 and 300 μm, e.g. 40, 75, 150 or 270 μm.

When the current collector (b) comprises a graphite layer the graphite layer preferably has a thickness of between 100 and 400 μm, more preferably between 200 and 300 μm, e.g. about 250 μm.

Preferably the current collector (b) is or comprises graphite due to its low price and inert properties.

In one embodiment, particularly in electrode units intended for use in a CDI device, the current collector (b) and electrode (c) are sandwiched between one or more charge barrier(s) (d).

The major cross-sectional area (i.e. parallel to the main surface) of the part of the connector (e) which is inside the housing (a) (shown in the drawings as part (e1)) is less than 30%, more preferably less than 25% and especially less than 15% of the major cross-sectional area of the current collector (b).

Preferably the major cross-sectional area of the part of the connector (e) which is inside the housing (a) is more than 0.2%, more preferably more than 1% and especially more than 3% of the major cross-sectional area of the current collector (b).

The major cross-sectional area of the part of the connector (e) which is inside the housing (a) is indicated in FIGS. 2, 7, 8a, 8b, 9 and 11 by "(e1)" while the part of the connector (e) which extends beyond the housing (a) is indicated by "(e2)". In FIGS. 2 and 7 the major cross-sectional area of the current collector (b) is slightly larger than the surface area of the shown spacer element (j) as can be concluded from FIG. 3b and FIG. 6. In FIG. 9 the major cross-sectional area of the current collector (b) is shown as well as the major cross-sectional area of the part of the connector (e) which is inside the housing (a) (i.e. part (e1)) which is oriented in a plane parallel to the current collector (b).

The electrode (c) is preferably porous and capable of temporarily storing ions. The electrode (c) preferably has a large specific surface area, preferably greater than 100 m$^2$/g, more preferably greater than 600 m$^2$/g, especially greater than 1000 m$^2$/g, e.g. about 1150 m$^2$/g, or even greater than 1200 m$^2$/g, e.g. about 1500 m$^2$/g. The electrode (c) preferably has a thickness of 6 to 1000 μm, more preferably of 50 to 400 μm, especially of 80 to 260 μm.

The electrode (c) preferably comprises an active porous material and a binder to keep the active material together. Further the electrode (c) may comprise a conducting agent. The active material may include at least one material selected from the group consisting of an activated carbon, aerogel, graphene, carbon nanotubes ("CNTs"), a mesoporous carbon, an activated carbon fiber, carbide derived carbon, a graphite oxide, a metal oxide and other materials with similar characteristics. A porous carbon-containing electrode (c) is preferred.

Examples of the binder include styrene butadiene rubber ("SBR"), carboxymethylcellulose ("CMC"), polytetrafluoroethlyene ("PTFE"), polyvinylidene fluoride ("PVDF"), polytrifluoroethylene ("PTrFE") and other materials with similar characteristics.

Examples of the conducting agent include carbon black, vapor growth carbon fiber ("VGCF"), graphite, a combination of at least two thereof, or other materials having similar characteristics.

Preferably the electrode unit (1) comprises one or two electrodes (c). The electrode(s) (c) are in electrical contact with the current collector (b), either directly or indirectly. When the electrode unit (1) comprises two electrodes (c), preferably the electrode unit (1) comprises one current collector (b), e.g. in the order (c)(b)(c). Furthermore, when the electrode unit (1) comprises two electrodes (c), preferably the electrode unit (1) comprises one current collector (b) and optionally a charge barrier (d) on each outer side of the electrodes (c), e.g. in the order (d)(c)(b)(c)(d). When the electrode unit (1) comprises only one electrode (c) preferably the electrode unit (1) comprises only one charge barrier (d), e.g. the electrode unit (1) comprises the current collector (b), electrode (c) and optional charge barrier (d) in the order (b)(c)(d), optionally further comprising a support on the side of the current collector (b) opposite to the electrode (c). Optionally the support is provided by or attached to the electrically non-conductive circumferential housing (a).

Preferably each electrode (c) is in direct contact with a charge barrier (d).

For use in a CDI device each electrode (c) is preferably secured to a charge barrier (d) (e.g. to an ion exchange membrane), at least at the fluid inlet (f) end of the flow compartment where the influent fluid enters the flow compartment. In this way one may prevent influent fluid from flowing between the electrode (c) and the charge barrier (d). Securing may be done by, for example, ultrasonic welding, gluing or clamping.

In one embodiment the electrode (c) is present as a coating layer on one side or on both sides of the current collector (b). In another embodiment the electrode (c) is in the form of a sheet which is in face-to-face contact with the current collector (b). When the electrode (c) is in the form of a sheet (to give a sheet electrode (c)), the electrode unit (1) optionally comprises two sheet electrodes (c) in face-to-face contact with the current collector (b) (one on each side of current collector (b)). In one embodiment when the edges of the charge barrier (d) that run parallel to side walls (SW1) and (SW2) are not sealed, preferably the spacer element (j) is 2 to 12 mm smaller in width, more preferably 3 to 8 mm smaller in width than the corresponding width of the charge barrier (d). The width of the flow compartment, and thus the distance between side walls (SW1) and (SW2), is preferably narrower than the charge barrier (d) by the same amount. The part of the gasket (v) overlapping the charge barrier (d) preferably provides a fluid-tight seal, thereby reducing the chance of fluid leaking from the flow compartment.

When the electrode (c) is present on the current collector (b) as a coating layer, preferably less than 100% of the surface area of the current collector (b) is coated with the electrode (c). Preferably at least a part of the current collector (b) is not coated with electrode (c). The uncoated part of the current collector (b) may be used to secure an electrically conductive connector (e) to the current collector (b). When the electrode (c) is a sheet electrode, in one embodiment the sheet electrode (c) does not cover the current collector (b) completely, i.e. a part of the surface of the current collector (b) is not in physical contact with the sheet electrode (c). Thus preferably the major cross-sectional area of the current collector (b) is greater than the major cross-sectional area of the electrode (c).

Preferably the electrode (c) is or comprises elemental carbon.

Preferably the charge barrier(s) comprise a layer comprising an ion exchange material, for example an organic ion exchange material (e.g. an ion exchange membrane and/or an ion exchange resin) or an inorganic ion exchange material (e.g. a zeolite, montmorillonite or clay having ion exchange properties) and composites comprising such organic and inorganic ion exchange materials. Although the charge barrier(s) (d) are not part of the flow compartment, they typically delimit the top and bottom of the flow compartment and act as a top wall and a bottom wall for the flow compartment.

The membranes which may act as charge barriers (d) are typically ion exchange membranes and the top and bottom membranes above and below the flow compartment have opposite polarity to each other, e.g. one of the bottom and top charge barriers (d) comprises a cation exchange membrane and the other comprises an anion exchange membrane.

Typically the charge barrier (d) is permeable to cations and impermeable to anions or impermeable to cations and permeable to anions. When an electrode unit (1) according to the present invention comprises more than one charge barrier (d) it is preferred that all of the charge barriers (d) of that electrode unit (1) are permeable to cations and impermeable to anions or all of the charge barriers (d) of that electrode unit (1) are impermeable to cations and permeable to anions.

The average thickness of the charge barrier (d), for example the ion exchange membrane, is preferably between 10 and 250 µm, more preferably between 40 and 140 µm, especially between 90 and 140 µm.

In one embodiment the electrode unit (1) comprises a cation exchange material or an anion exchange material. The cation exchange material or the anion exchange material may be present as a layer on the respective electrodes (c) whereupon the ion exchange material acts as charge barrier (d). The average thickness of the ion exchange layer in this embodiment is preferably between 1 and 100 µm, more preferably between 3 and 30 µm.

Preferably the current collector (b), the electrode (c) and the charge barrier (d) are adjacent to each other, e.g. they form parallel layers or sheets. For example, the current collector (b), the electrode (c) and the charge barrier (d) overlap. In one embodiment the areas of the current collector (b), the electrode (c) and the charge barrier (d) differ in size, for example the current collector (b) has a major cross-sectional area which is greater than the major cross-sectional area of the charge barrier (d) and the major cross-sectional area of the charge barrier (d) is greater than the major cross-sectional area of the electrode (c). In another embodiment the major cross-sectional area of the electrode (c) is about the same as the major cross-sectional area of the charge barrier (d).

As described above the electrode unit (1) may comprise two electrodes and two charge barriers. In one embodiment, the top and bottom charge barriers (d) may have the same size as each other and the top and bottom electrodes (c) may have the same size as each other, leaving a small opening on the side of the current collector (b) opposite the connector (e) that may be sealed with a sealant (s) if desired.

In a further embodiment of the electrode unit according to the first aspect of the present invention the major cross-sectional area of the charge barrier (d) is greater than the major cross-sectional area of the current collector (b) and the current collector (b) has a major cross-sectional area which is greater than or the same as the major cross-sectional area of the electrode (c). In another embodiment of the electrode unit according to the first aspect of the present invention the major cross-sectional area of the electrode (c) is substantially the same as the major cross-sectional area of the effective surface area of the charge barrier (d). In a still further embodiment of the electrode unit according to the first aspect of the present invention the major cross-sectional area of the current collector (b) is the same as or greater than the major cross-sectional area of the electrode (c). The effective surface area of the charge barrier (d) is the area within the side walls (t) as indicated in FIGS. 8a and 8b. The electrode units of these embodiments are particularly suitable for use in ED devices.

The electrically conductive connector (e) may be in direct or indirect electrical contact with the current collector (b), e.g. in direct electrical contact by physical contact with the current collector (b) or indirectly by contact with an intermediate, electrically conductive material (e.g. a conductive adhesive (m)) which is in turn in contact with both the connector (e) and the current collector (b).

The connector (e) preferably comprises or consists of carbon, e.g. graphene, and/or a metal, especially a metal, e.g. silver, gold, aluminum, platinum or, more preferably, copper, an alloy or a plated metal comprising two or more metals.

Preferably the volume resistivity of the connector (e) is at most 10%, more preferably at most 1%, of the volume resistivity of the current collector (b). Thus the ratio of the volume resistivity of the connector (e) and of the current collector (b) is preferably less than 0.1, more preferably less than 0.01. Volume resistivity may be measured according the IPC-TM-650 test method.

Preferably the connector (e) has a thickness of between 5 and 600 µm, more preferably between 10 and 410 µm, e.g. between 30 and 200 µm.

Preferably the connector (e) has a width of between 1 and 30 mm, more preferably between 3 and 20 mm.

Preferably the thickness of the part of the connector (e) which is inside the housing (a) (i.e. part (e1)) is less than its width. Preferably the width/thickness ratio of the part of (e) which is inside the housing (a) (i.e. part (e1)) is larger than 2, more preferably larger than 10 and preferably smaller than 5000, more preferably smaller than 500.

For economic reasons the size (width and thickness) of the connector (e) is preferably as small as possible without increasing its electrical resistance or decreasing its strength to unacceptable levels.

Preferably the connector (e) is adhered to the current collector (b) by means of an electrically conductive adhesive (m). The electrically conductive adhesive (m), when cured, optionally ionically insulates the connector (e) from the current collector (b) thereby preventing galvanic corrosion of the connector (e) by providing a barrier which prevents fluid passing through a device comprising the unit from coming into contact with the connector (e). By ionically insulating the connector (e) from the current collector (b) a less noble material (e.g. metal) can be used for construction of the connector (e). The electrically conductive adhesive (m) is optionally (before curing) a liquid, a paste, a film or a tape.

Preferably the electrically conductive adhesive, when cured, is stable to fluids having a high concentration of ionic species and has a low electrical volume resistivity, preferably less than 0.1 ohm·cm, especially lower than 0.01 ohm·cm.

In a preferred embodiment the connector (e) comprises a metal strip, e.g. made of copper or brass, and is adhered to the current collector (b) along one of the current collector (b)'s edges.

When the connector (e) comprises an electrically conductive adhesive (m) on one side it is preferred that at least a part of the other side of the connector (e) is covered by a protective coating or a protective film (n), e.g. a tape. The protective coating is optionally an adhesive with which the connector (e) is adhered to the housing (a). The protective film (n) preferably comprises a single or double sided adhesive tape.

The protective coating or film (n) preferably has a thickness of between 10 and 200 µm, e.g. about 25, 50 or 100 µm. The protective coating or film (n) may be the same material as the electrically conductive adhesive (m) or may be different. Preferably the protective coating or film (n) is electrically non-conductive. Materials suitable as protective coating or film (n) may comprise cyanoacrylates, polyurethanes, functionalized silicones and/or polyepoxides. Preferably the protective coating or film (n) is or comprises an elastic material, i.e. the elastic or Young's modulus of the protective coating or film (n) is preferably lower than 2 GPa, more preferably lower than 1 GPa, e.g. 0.4 or 0.6 GPa. Young's modulus may be determined by, for example, the method of ISO 37. The Shore A hardness of the protective coating or film (n) is preferably lower than 90, more preferably lower than 80, e.g. 60, 65 or 70. Examples of commercially available materials suitable for use as protective coating or film (n) include flexible cyanoacrylates from Henkel, e.g. Loctite™ 4902 and 4903; Apollo™, Cyberlite™ and Xtraflex™ adhesives from Cyberbond LLC, e.g CB 2240; Scotch-Weld™ adhesives from 3M™, e.g. Scotch-Weld™ Flexible Instant Adhesive FLX300; Rubber Toughened Cyanoacrylates from Powerbond Adhesives Ltd and toughened cyanoacrylates from Permabond Engineering Adhesives Ltd. Shore A hardness may be measured by, for example, the method of ISO 868. The protective coating or film (n) preferably serves to ionically insulate the connector (e) from fluid which passes through the flow compartment. Thus preferably the protective coating or film (n) acts as a barrier which prevents liquid from coming into contact with the connector (e) within the electrode unit (1).

If desired an additional sealant (p) may be applied to further insulate the connector (e) ionically from the electrode (c). The sealant (p) may be made from the same material as that used for the protective coating or film (n) or it may be made from a different material. Preferably sealant (p) and protective coating or film (n) are made from the same material.

Thus preferably the part of the connector (e) which is located within the circumference of the circumferential housing (a) (i.e. part (e1)) is ionically insulated by a barrier, e.g. covered on all sides by an ionically insulating material so as to prevent galvanic corrosion. Preferably the electrode unit (1) further comprises an insulator present on the part of the connector (e) which extends beyond the housing (a) (i.e. part (e2)), e.g. protective coating or film (n), sealant (p) and/or a polymeric shrink sleeve.

At least a part of the connector (e) that extends outside of the circumference of the circumferential housing (a) (i.e. part (e2)) is electrically conductive and optionally comprises means for connection to a power supply. Optionally the electrode unit (1) further comprises a support (q) for the part of the connector (e) that extends outside of the circumference of the circumferential housing (a). Preferably support (q) is attached to housing (a) or forms a part of housing (a). In any case one will ensure that the support (q) does not prevent connector (e) from being in electrical contact with a power supply. Electrical contact between the connector (e) and a power supply may be achieved by, for example, soldering or clamping an electrical wire to the connector (e).

In one embodiment the sum of the major cross-sectional area of the part (e1) of the connector (e) located within the circumference of the circumferential housing (a) and the major cross-sectional area of the electrode (c) is less than the major cross-sectional area of the current collector (b). In this way one may separate the connector (e) from the electrode (c) thereby reducing the likelihood for galvanic corrosion of the connector (e). When the electrode (c) is only present at one side of the current collector (b) and the connector (e) is located at the opposite side then the electrode (c) and the connector (e) are separated from each other by the current collector (b) and the major cross-sectional area of the electrode (c) need not be less than the major cross-sectional area of the current collector (b).

Preferred electrically conductive adhesive (m) comprises particles comprising graphite, silver, gold, platinum, palladium, nickel, tin, indium, copper, aluminum, carbon nanotubes, carbon black, graphene, polyaniline, poly(3,4-ethylene dioxy thiophene) or a combination comprising two or more thereof. Examples of preferred conductive particles include silver-coated glass particles, silver-coated nickel particles, silver-coated aluminum particles, silver-coated copper particles, silver-coated PMMA particles and silver-coated graphite particles. Particles having an inert core, such as glass and PMMA, are preferred. Examples of commercially available conductive particles suitable for preparing electrically conductive adhesive (m) include Conduct-O-Fil® particles from Potters Industries LLC, Conductospheres™ from Cospheric LLC, silver-coated nickel spheres from NOVAMET Specialty Products Corp.

The preferred electrically conductive adhesive particles (e.g. electrically conductive particles), preferably have an average diameter of between 0.001 and 100 µm. Such particles preferably have a flake shape, a spherical shape, a needle shape, a dendrite shape or comprise a combination two or more of such particle shapes.

Preferably the electrically conductive adhesive (m) comprises a silicone, polyurethane, a polyepoxide (e.g. a thermally curing epoxy resin) and/or an acrylate (e.g. a UV curable acrylate). Examples of commercially available electrically conductive adhesives (m) include EP77M-F, MasterSil™ 705S, EP21TDCS and EP21TDCSFL from Masterbond; 8330 Silver Conductive Epoxy and 8331 Silver Conductive Epoxy from MG Chemicals; 118-15A/B, GPC 251, 124-08 A/B and 124-08LVC from Creative Materials Inc.; several Elecolie adhesives from Panacol AG; silver & nickel-filled conductive adhesives from Aremco Products Inc.; LOCTITE ABLESTIK™ ICP 4298 Silicone based electrically conductive adhesive from Henkel; several CHO-BOND® and TECKNIT® adhesives from Parker Chomerics; several electrically conductive adhesives from Silicone Solutions such as SS-24, SS-25, SS-26 and SS-27; CLN-658 and several ACE™ and Metaduct™ adhesives from Protavic America; SEC1222 and SEC1233 from Resinlab® LLC; several Metaduct adhesives from Mereco Technologies Inc.; SoltaBond™ SB1227, Polytec EC 101 and Polytec™ PU-1000 from Polytec PT GmbH. Examples of adhesive films include: Ablestik Ablefilm™ ECF550 and ECF563 from Henkel.

Preferably the electrically conductive, cured adhesive is present between the connector (e) and the current collector (b) as a layer of thickness of between 1 and 200 µm, more preferably between 8 and 100 µm, especially between 12 and 50 µm, e.g. 15, 30 or 40 µm.

Preferably the electrode unit (1) is adapted to be stackable with further electrode units (1) according to the present invention, preferably with a spacer (h) between each electrode unit (1), thus making the electrode unit (1) particularly suitable for use in a CDI device.

Preferably the electrode unit (1) according to the first aspect of the present invention is constructed such that fluid passing through an electrode-spacer composite, a stack or device comprising the electrode unit (1) does not come into contact with the connector (e). Thus the electrode unit (1) according to the first aspect of the present invention preferably further comprises a barrier which prevents fluid passing through an electrode-spacer composite, a stack or a device comprising the electrode unit (1) to come into contact with the connector (e). Preferably the barrier comprises an electrically conductive adhesive (m), a protective coating or film (n) and/or an additional sealant (p).

Preferably the connector (e) is not in direct contact with the electrode (c) nor with the charge barrier (d), i.e. the connector (e), is preferably physically separated from the electrode (c) and the charge barrier (d). Preferably the physical distance between the connector (e) and the electrode (c) and between the connector (e) and the charge barrier (d) when located at the same side of the current collector (b) is at least 300 µm, more preferably at least 1000 µm. When the connector (e) and electrode (c) of an electrode unit (1) are located on opposite sides of the current collector (b) then the physical distance between the connector (e) and the electrode (c) is equal to the thickness of the current collector (b) plus, when present, the thickness of any electrically conductive adhesive (m) used to adhere the connector (e) and optionally electrode (c) to the current collector (b).

In electrode units (1) intended for use in a CDI device the housing (a) typically comprises a fluid inlet (f) and a fluid outlet (g). When the electrode unit (1) is in contact with a spacer (h) (e.g. as shown in FIG. 2) the fluid inlet (f) provides a means for liquid to flow into the flow compartment near the inlet end walls ((IW1) and (IW2)), the fluid may then flow through the flow compartment between and in contact with the charge barriers (d) of adjacent electrode units (1) and then exit the flow compartment through the fluid outlet (g) near the outlet end walls ((OW1) and (OW2)). Thus the fluid inlet (f) and a fluid outlet (g) are in fluid communication with a flow compartment in the spacer (h) between two electrode units (1).

Preferably the fluid inlet (f) and the fluid outlet (g) each independently have a diameter of 5 to 40 mm, more preferably between 10 and 35 mm. The housing (a) may comprise one or several fluid inlets (f) for an influent stream of fluid requiring the removal of ions, e.g. desalination, and/or several fluid outlets (g), preferably between 1 and 4 fluid inlets (f) and between 1 and 4 fluid outlets (g), more preferably 1 or 2 fluid inlets (f) and 1 or 2 fluid outlets (g).

The inlet end walls ((IW1) and (IW2)) of the flow compartment preferably have a length of 20 to 200 mm, more preferably 25 to 100 mm and especially 30 to 80 mm.

The outlet end walls ((OW1) and (OW2)) of the flow compartment preferably have a length of 20 to 200 mm, more preferably 25 to 100 mm and especially 30 to 80 mm.

The flow compartment may have any cross-sectional shape, for example square, rectangular, hexagonal or decagonal. However it is preferred for the flow compartment to have a generally hexagonal or decagonal shape because this reduces the number of "dead corner" areas of slow or no fluid flow that would occur if the flow compartment is of square or rectangular cross-sectional shape.

Preferably the internal angle between each fluid inlet wall and the side wall to which the inlet wall is connected (i.e. the angle between (IW1) and (SW1) and between (IW2) and (SW2)) is identical.

Preferably the internal angle between each outlet wall and the side wall to which the outlet wall is connected (i.e. the angle between (OW1) and (SW1) and between (OW2) and (SW2)) is identical.

The internal angle between the end walls on each side of the (or each) fluid inlet (f) (i.e. the angle between (IW1) and (IW2)) is preferably 95° to 150°, more preferably 120° to 140°, e.g. 128°, 132°, 136° or 139°.

The internal angle between the end walls on each side of the (or each) fluid outlet (g) (i.e. the angle between (OW1) and (OW2)) is preferably 95° to 150°, more preferably 120° to 140°.

The internal angle between the end walls on each side of the (or each) fluid inlet (f) (i.e. the angle between (IW1) and (IW2)) may be the same as or different to the internal angle between the end walls on each side of the (or each) fluid outlet (g) (i.e. the angle between (OW1) and (OW2)).

By using the preferred angles the flow through the flow compartment is homogeneous without dead corners where there is almost no flow. Regions with low or no flow are very sensitive to severe scaling and fouling and are therefore not desired.

Where the end walls are not straight (e.g. they are curved, kinked, stepped, undulating etc.) one may calculate the average path of the wall and use that to calculate the internal angle. Preferably the end walls are substantially straight.

According to a second aspect of the present invention there is provided an electrode-spacer composite comprising an electrode unit (1) according to the first aspect of the present invention and a spacer (h), wherein the spacer (h) abuts the electrically non-conductive circumferential housing (a). Such composites are particularly useful for CDI devices.

Preferably the spacer (h) comprising a gasket (v) which sits on the housing (a) and defines the side walls and end walls of a flow compartment. The spacer (h) therefore preferably comprises one or more gaskets (v), preferably a single gasket (v). The gasket(s) (v) prevent fluid from leaking out of the flow compartment and provides end walls ((IW1), (IW2), (OW1) and (OW2)) and side walls ((SW1) and (SW2)) of the flow compartment.

Preferably the spacer (h) further comprises a fluid-permeable spacer element (j). Typically the fluid-permeable spacer element (j) is located within the internal borders of the gasket(s) (v), i.e. within the flow compartment.

The fluid-permeable spacer element (j) typically provides voids through which fluid may pass through the flow compartment and can also be useful for keeping parts of the resultant stack or CDI device above and below the compartment apart to ensure that fluid can continue to flow through the compartment even when the various component parts of the stack or CDI device are compressed tightly together.

The fluid-permeable spacer element (j) preferably has an open network structure which allows fluid to flow therethrough. The fluid-permeable spacer element (j) is typically designed to fit snuggly in a void defined by the internal side walls and internal end walls of one or more (preferably one) gasket (v).

In the electrode-spacer composites, stacks and CDI devices of the present invention, charge barriers (d) are typically provided above and below the flow compartment, i.e. one from each adjacent electrode unit (1).

The fluid-permeable spacer element (j) preferably comprises a woven or non-woven netting (or mesh), preferably having a thickness of 100 to 500 µm, more preferably 150 to 300 µm, e.g. about 210 µm, about 250 µm or about 270 µm. The orientation of the strands of the netting is preferably about 45° with respect to the main flow direction of fluid through the flow compartment. The size of the openings in the netting is preferably between 70 and 500 µm, more preferably between 100 and 400 µm. The fluid-permeable spacer element (j) is preferably made of an inert, electrically insulating material. Suitable inert, electrically insulating materials include polyethylene, polypropylene, polyamide, polyethylene terephthalate, polyimide, fiberglass and polyvinylchloride. Examples of commercially available materials which may be used as the fluid-permeable spacer element (j) include extruded netting from Delstar (e.g. N01014-60PP-NAT, N1014-90PP-NAT and N01017-90PP-NAT) and woven material from Sefar (e.g. NITEX 06-475/56, NITEX 03-300/51, NITEX 06-390/47, NITEX 07-240/59 and NYTAL PA 06-212).

The gasket (v) can be used to define the height of the fluid path through the flow compartment and to prevent fluid entering or leaving the flow compartment via routes other than the fluid inlet (f) and fluid outlet (g).

Preferably the gasket(s) (v) comprise a material having a Shore A hardness of between 40 and 90, more preferably between 50 and 80, e.g. about 60, because such a Shore hardness has the advantage that a good, fluid-tight seal can be obtained. The gasket(s) (v) are preferably made of an inert, electrically insulating material. Suitable materials for the gasket (v) include silicone based polymers, polyurethanes and rubbers such as chloroprene rubber, (chloro)butyl rubber, chlorosulfonated polyethylene (hypalon) rubber and styrene-butadiene rubber.

In an alternative embodiment the fluid-permeable spacer element (j) is omitted and instead the electrode units (1) are kept the desired distance apart in the electrode-spacer composite, stack or device by a mechanical means, e.g. by providing the electrode units (1) and/or the charge barriers (d) with lugs or protrusions which are the desired distance apart, for instance by using a charge barrier (d) (e.g. an ion exchange membrane) having a profiled surface.

Preferably the housing (a) and the spacer (h) (when present) comprise a means for attaching the electrode units (1) to one or more further electrode units (1), e.g. a plurality of openings (k) which can receive bolts to attach multiple electrode units (1) together, preferably with a spacer (h) between each electrode unit (1) to form a stack.

The electrode-spacer composites are useful items of commerce for building stacks and CDI devices.

According to a third aspect of the present invention there is provided a stack (e.g. a CDI stack) comprising two or more electrode units (1) according to the first aspect of the present invention or two or more electrode-spacer composites according to the second aspect of the present invention.

Typically the stacks comprise spacers (h) between the electrode units (1). Furthermore, in a capacitive deionization device the electrode units (1) are typically arranged to be alternately anodic electrode units and alternately cathodic electrode units throughout the stack.

The spacers (h) provide end walls ((IW1), (IW2), (OW1) and (OW2)) and side walls ((SW1) and (SW2)) for a flow compartment and the charge barriers (d) (one from each adjacent electrode unit (1)) delimit the top and bottom of a flow compartment.

The electrode units (1) are typically ordered in the stack such that the charge barrier (d) of each electrode unit (1) has an opposite permeability to anions and cations to the charge barrier (d) of the next electrode unit (1). For example, the electrode units (1) alternate throughout the stack from electrode units (1) comprising a cation exchange membrane charge barrier (d) to electrode units (1) comprising an anion exchange membrane charge barrier (d). In this way, one may ensure that each flow compartment is delimited by top and bottom charge barriers (d) having opposite permeability to anions and cations. Fluid containing ions which pass through the flow compartments can then be desalinated by cations permeating through one of the charge barriers (d) and anions permeating through the other of the charge barriers (d).

In one embodiment each two or more electrode units (1) are oriented within the stack such that the fluid outlet (g) within the stack is in fluid communication with the fluid inlet (f) of a next flow compartment within the stack. In this way, influent fluid having a high concentration of ions may enter the fluid inlet (f), flow through the flow compartment and then out through the fluid outlet (g) and into the fluid inlet (f) of the next flow compartment.

Preferably the electrode unit (1) is adapted to be stackable with further electrode units and spacers (h).

A preferred CDI stack or CDI device according to the present invention comprises electrode units (1) and spacers (h) arranged as follows:

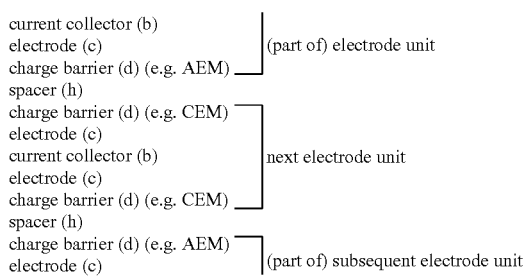

AEM means anion exchange membrane and CEM means cation exchange membrane.

A preferred CDI stack according to the third aspect of the present invention comprises:
a. two or more electrode units (1) according to the first aspect of the present invention; and
b. a spacer (h) between each electrode unit (1) and the next comprising a gasket (v) which defines the side walls and end walls of a flow compartment through which fluid may flow;
wherein:
(a) the order of electrode units (1) throughout the stack is alternately anodic electrode unit then cathodic electrode unit or cathodic electrode unit then anodic electrode unit;

(b) the top and bottom of the flow compartments are delimited by charge barriers (d) of adjacent electrode units (1); and
(c) for each flow compartment, the charge barrier (d) which delimits the top of that flow compartment has opposite ionic permeability and opposite ionic impermeability to the charge barrier (d) which delimits the bottom of that flow compartment.

Preferably the electrode units (1) in the CDI stack are arranged such that the electrically conductive connectors (e) in adjacent electrode units (1) are oriented near opposite edges of the corresponding current collectors (b). Thus when for instance a connector (e) is in electrical contact with a current collector (b) along the edge closest to side wall SW1 then the connector (e) of the adjacent electrode unit (1) is preferably in electrical contact with the current collector (b) of that electrode unit (1) along the edge closest to side wall SW2, as is illustrated in FIG. 6.

The combined thickness of the current collector (b), the electrode(s) (c) and the charge barrier(s) (d) and the thickness of the housing (a) are not specifically related to each other but are preferably about the same. Before compression the combined thickness of the housing (a) and the gasket (v) is preferably 20 to 200 µm thinner than the combined thickness of the current collector (b), the electrode(s) (c), the charge barrier(s) (d) and the spacer element (j), more preferably 40 to 120 µm thinner, e.g. 60 or 90 µm thinner. The preference for the combined thickness of the current collector (b), the electrode(s) (c), the charge barrier(s) (d) and the spacer element (j) to be thinner than the combined thickness of the housing (a) and the gasket (v) arises because this reduces the force required to make the side and end walls of the stack fluid-tight and obtain a good contact between the various layers of the electrode unit (1).

Optionally the CDI stack of the present invention is configured such that the electrode units (1) and spacers (h) are flat and are stacked alternately. Alternatively, the CDI stack of the present invention has a spiral-wound configuration wherein the electrode units (1) and spacers (h) are stacked alternately around a central rod or hollow tube.

Optionally each electrode unit (1) further comprises a support (q) attached to or forming a part of housing (a) for the part of the connector (e) that extends outside of the circumference of the circumferential housing (a) (i.e. part (e2)) whereby one will ensure that each support (q) does not prevent each connector (e) from being in electrical contact with a power supply as is exemplified in FIG. 7. Preferably at least part of the supports is stacked to increase the robustness of the construction. Thus in electrode units (1) intended for use in a CDI device preferably at least part of supports (q) and connectors (e) of anodic electrode units (1) are alternatingly stacked and also at least part of supports (q) and connectors (e) of cathodic electrode units (1). Optionally the connector (e) is adhered to the support (q) e.g. by an adhesive to further reduce the chance of the connector (e) to break or tear.

According to a fourth aspect of the present invention there is provided a stack for an ED device comprising at least two electrode units (1) according to the first aspect of the present invention and, located between the two electrode units (1), a membrane stack comprising alternate cation exchange membranes and anion exchange membranes running parallel to the electrode units (1) and flow compartments between said membranes through which fluid may flow.

Preferably the ED stack further comprises spacers (h) (comprising e.g. fluid-permeable spacer elements (j) as hereinbefore defined and discussed) which keep the cation and anion exchange membranes apart and/or the cation and/or anion exchange membranes have a textured surface profile which keeps the cation and anion exchange membranes sufficiently apart to allow fluid to pass therebetween.

Preferably the ED stack is a crossflow ED stack, i.e. the ED stack is constructed such that fluid will flow through each flow compartment in a different direction to fluid flowing through the adjacent flow compartments, preferably such that the direction fluid flows through each flow compartments is at an angle of 90° relative to the direction of fluid flow through the adjacent flow compartment. Preferably the ED stack is constructed such that fluid flows into and out of the stack in a plane parallel to the major cross-sectional area of the ED stack's membranes.

The electrode unit (1) of the present invention is useful as a component in numerous devices, including CDI and ED devices.

According to a fifth aspect of the present invention there is provided a capacitive deionisation device comprising two or more electrode units (1) (e.g. 10 to 300 electrode units (1)) according to the first aspect of the present invention or an electrode-spacer composite according to the second aspect of the present invention or a CDI stack according to the third aspect of the present invention.

Typically the CDI device of the fifth aspect of the present invention comprises an outer casing for the electrode units (1), the electrode-spacer composite or the stack. Typically the outer casing of the CDI device comprises a sealing layer before the first electrode unit (1) and a sealing layer after the last electrode unit (1). The outer casing of the CDI device is preferably non-conductive. Suitable non-conductive materials which may be used to construct the outer casing of the CDI device are described above in relation to the housing (a) of the electrode unit (1).

Preferably at least 25%, more preferably at least 50%, especially at least 75% and more especially all of the electrode units (1) present in the capacitive deionisation device of the present invention are electrode units (1) according to the first aspect of the present invention. Optionally the two outermost electrode units (1) comprise a current collector (b) having an electrode (c) at one side and a sealing layer at the opposite side facing an end plate. Optionally the sealing layer is part of the end plate.

The CDI device preferably further comprises a power supply that is in electrical contact with the connectors (e) of the electrode units (1) present in the CDI device. The power supply is preferably capable of providing a voltage of 0.3 to 1.7V per electrode unit (1), more preferably about 1.6V per electrode unit (1). The connectors (e) preferably have a low electrical resistance to limit electrical power losses. The connectors (e) may be joined to an electrically conducting wire connected to the power supply by, for example, clamping, soldering, clinching, spot welding, ultrasonic welding and/or gluing with an electrically conductive adhesive.

The area of the flow compartment that allows ion transport towards the electrodes (c) is called the active area. The active area is located adjacent the charge barriers (d). The flow compartment preferably has an active area of 40 to 2500 cm$^2$ adjacent each charge barrier, more preferably 200 to 2000 cm$^2$, e.g. 225, 300, 450 or 1200 cm$^2$. The length and/or width of the active area are preferably each independently 50 to 500 mm. In FIG. 2 the active area is the rectangular area defined by side walls (SW1) and (SW2) and an imaginary line drawn from (a) the junction of side wall (SW1) and end wall (IW1) to the junction of side wall (SW2) and end wall (IW2); and (b) the junction of side wall (SW1) and end wall (OW1) to the junction of side wall (SW2) and end wall (OW2).

The influent fluid (e.g. hard water) enters the flow compartment through the fluid inlet (f), flows over the active surface area and leaves the flow compartment through the fluid outlet (g). Preferably the complete active area is used efficiently in the removal of ions.

Thus the fluid inlets (f), flow compartments and fluid outlets (g) together define a flow channel through the CDI device through which fluid requiring desalination may pass. In use the CDI device further comprises an influent fluid (typically water containing a higher than desired mineral content) present in the flow compartments.

Thus the device according to the fifth aspect of the present invention typically comprises a spacer (h) between each electrode unit (1) and the next electrode unit (1) comprising a gasket (v) which defines the side walls and end walls of a flow compartment, wherein the electrically non-conductive circumferential housing (a) of each electrode unit (1) comprises a fluid inlet (f) and a fluid outlet (g) and the fluid inlets (f), fluid outlets (g) and flow compartments together define a flow channel through the device through which fluid requiring desalination may pass. As mentioned above, charge barriers (d) (one from each adjacent electrode unit (1)) delimit the top and bottom of each flow compartment.

The capacitive deionization device of the present invention preferably further comprises top and bottom end plates and optionally a means for securing the electrode units (1) and intervening spacers (h) together. These end plates are typically disposed as an outermost layer, beyond the stack of electrode units (1) and can be used to hold the electrode units (1) and intervening spacers (h) together. Typical end plates are made of metal or polymeric material. The end plates may be solid plates, plates comprising hollow spaces, or be in the form of a mesh or grate, e.g. a honeycomb pattern, or a combination thereof. The end plates may also comprise corrugated parts or dovetail shaped elements.

According to a sixth aspect of the present invention there is provided an ED device (i.e. electrodialysis (including electrodialysis reversal) devices and reverse electrodialysis devices) comprising an ED stack according to the fourth aspect of the present invention and an outer casing (A) having a fluid inlet(s) and fluid outlet(s), wherein the ED stack is located within the outer casing (A).

In a preferred embodiment the connector (e) of the electrode unit(s) (1) present with the ED device according to the sixth aspect of the present invention extends beyond the outer casing (A). In this way one may easily connect an external power source to the connector (e) (in the case of an electrodialysis (including electrodialysis reversal) device) or harvest electricity produced (in the case of a reverse electrodialysis device).

For the avoidance of doubt the construction of an electrodialysis stack is similar to the construction of a reverse electrodialysis stack, although its components are preferably optimized for the specific application, e.g. spacers and membranes with characteristics appropriate for the specific application are selected.

A preferred method of performing electrodialysis comprises switching both electrode potential and fluid flows through an ED stack according to the fourth aspect of the present invention or an ED device according to the sixth aspect of the present invention, typically at regular intervals. This method is also known as electrodialysis reversal (EDR).

In an ED stack intended for use in a reverse electrodialysis device, fluids having different ionic concentrations may pass simultaneously through the fluid inlet(s), between alternate membranes of the stack, then exit the device through the fluid outlet(s). Ions from the fluid having the highest ionic concentration pass through the membranes into the fluid having lower ionic concentration, thereby generating electricity from the flow of ions from the fluid having the highest ionic concentration to the fluid having the lowest ionic concentration. In the case of electrodialysis, electricity may be applied across the electrode units (1) to attract ions from fluid passing through ion diluting compartments into ion concentrating compartments, thereby deionizing the fluid passing through the ion diluting compartments.

In a preferred ED device, the electrode units (1) according to the first aspect of the present invention preferably comprises an electrically non-conductive circumferential housing (a), a current collector (b) and one electrode (c) in the order (a)(b)(c).

Preferably the ED devices according to the sixth aspect of the present invention further comprise an end-plate, wherein the electrode unit (1) is adjacent to the end plate. The circumferential housing (a) of the electrode unit (1) may be adjacent to the end plate, may form part of the end plate or may even be the end plate. Optionally the ED device according to the sixth aspect of the present invention further comprises a sealing layer located between the electrode unit (1) and said end plate.

Preferred sealing layers referred to in this specification are electrically non-conductive. The sealing layers preferably have a Shore A hardness of 40 to 90, more preferably 50 to 80, e.g. about 60, because sealing layers having such a Shore A hardness typically provide a good, fluid-tight seal. Shore A hardness may be measured by the method of ISO 868. Suitable materials for the sealing layer(s) include silicone based polymers, polyurethanes and rubbers such as chloroprene rubber, (chloro)butyl rubber, chlorosulfonated polyethylene (hypalon) rubber, styrene-butadiene rubber and combinations of two or more of the foregoing.

Preferably the ED stacks present in the ED devices according to the sixth aspect of the present invention further comprise a spacer (h) present between each ion exchange membrane and the next.

Although a spacer (h) may be present between the electrode (c) and the charge barrier (d) this is generally not preferred.

The spacer (h) comprises a gasket (v) which defines the side walls of a flow compartment and optionally a fluid permeable spacer element (j) as described above.

In one embodiment the ED devices according to the sixth aspect of the present invention comprises at least two (e.g. 2, 3, 4 or 6) electrode units (1) according to the first aspect of the present invention.

Preferably in the ED devices according to the sixth aspect of the present invention the abovementioned gaskets (v) are provided by a polymeric gasket or an adhesive and the ED devices are constructed such that fluid flowing through each flow compartment present within the ED stack flows in a different direction to fluid flowing through the adjacent flow compartment(s) present within the ED stack. The gasket (v) is indicated in FIG. 8a, FIG. 8b and FIG. 11 as side walls (t).

Preferably the ED devices according to the sixth aspect of the present invention comprise a rectangular ED stack according to the fourth aspect of the present invention and an outer casing (A), the corners of the rectangular ED stack comprising recessions (r), wherein the rectangular ED stack is adhered to the outer casing (A) by means of a sealant forming a fluid-tight seal between adjacent sides of the stack. This construction allows for a larger membrane area per unit of volume of the housing than in conventional electrodialysis devices.

The inventors have also found that in the devices of the sixth aspect of the present invention it is possible to use the outer casing (A) as component (a) of each electrode unit (1) present in the device. This embodiment of the device typically comprises an (ED) stack comprising at least two electrode units (1) and, located between the two electrode units (1), a membrane stack comprising alternate cation exchange membranes and anion exchange membranes running parallel to the electrode units (1) and flow compartments between said membranes through which fluid may flow, wherein:

i) the outer casing (A) of the device acts as the electrically non-conductive circumferential housing for each electrode unit (1); and ii) each electrode unit (1) further comprises: (b) a current collector;
    (c) an electrode;
    (d) optionally a charge barrier; and
    (e) an electrically conductive connector in electrical contact with the current collector (b);
wherein:
    (i) the current collector (b), the electrode (c) and the charge barrier (d), when present, are located within the outer casing (A);
    (ii) the part (e1) of the connector (e) which is inside the outer casing (A) and the current collector (b) each have a main plane and the main plane of the connector (e) is oriented substantially parallel to the main plane of the current collector (b);
    (iii) the connector (e) extends beyond the outer casing (A); and
    (iv) the major cross-sectional area of the part (e1) of the connector (e) which is inside the outer casing (A) is less than 30% of the major cross-sectional area of the current collector (b).

In this embodiment the electrode unit (1) is preferably adjacent to an end plate that forms part of the outer casing (A); optionally a sealing layer is present between the electrode unit (1) and an end plate of the device.

According to a seventh aspect of the present invention there is provided a process for purifying a fluid comprising passing the fluid through a CDI stack according to the third aspect of the present invention, through an ED stack according to the fourth aspect of the present invention, through a CDI device according to the fifth aspect of the present invention or through an electrodialysis device according to the sixth aspect of the present invention.

In this seventh aspect of the present invention, a voltage is applied across electrode units (1) present in the CDI stack, the ED stack or the devices during the process.

The CDI stacks, electrodialysis stacks and CDI and electrodialysis devices of the present invention may be used to remove ions from a wide variety of fluids. They are particularly suitable for desalinating salty water (e.g. sea water or brackish water) and for the softening of hard water (water having a high content of calcium and magnesium ions) and can be applied in home appliances, e.g. washing machine, refrigerator, in industrial equipment, e.g. coffee machines, at so-called point-of-use applications, and for all kinds of water purification. The devices may also be used for water softening or purifying at a point-of-entry to supply softened or purified water to a household.

According to an eighth aspect of the present invention there is provided a process for generating electricity comprising passing a concentrated ionic solution and a dilute ionic solution through alternate compartments of (i) a reverse electrodialysis stack according to the fourth aspect of the present invention or (ii) a reverse electrodialysis device according to the sixth aspect of the present invention.

Use of the CDI stack, ED stack, CDI device and ED device of the present invention typically comprise a 'production phase' wherein ions are removed from the influent fluid and adsorbed in the electrodes (c) and a 'regeneration phase' wherein the adsorbed ions are released from the electrodes (c). In the 'regeneration phase' of a CDI device the ions are collected in a waste stream that may be discarded or recycled. Preferably the 'production phase' is performed for a period of 30 to 600 seconds. Preferably the 'regeneration phase' is performed for a period of from 10 to 360 seconds.

Use of an ED stack and ED device of the present invention typically comprises passing fluid through the flow compartments located between electrode units (1). During the production phase when the fluid is being deionised the compartment adjacent the electrode unit (1) is an ion diluting compartment and in the regeneration phase the compartment adjacent the electrode unit (1) is an ion concentrating compartment. When moving from the 'production phase' wherein ions are removed from the influent fluid and adsorbed in the electrodes (c) to the 'regeneration phase' wherein the adsorbed ions are released from the electrodes (c) the polarity of the positive and negative electrode is reversed (thus making the positive electrode become the negative electrode and vice versa) and compartments which removed ions from fluid passing therethrough (ion diluting compartments) become compartments which add ions to fluid passing therethrough (ion concentrating compartments) and vice versa. The reversing frequency is preferably between 0.5 and 20 times per hour, more preferably between 1 and 12 times per hour. During reverse electrodialysis periodical switching of the compartments used for concentrated ionic solution and for dilute ionic solution preferably takes place simultaneously with reversal of the electrode potential. In both the 'production phase' and the 'regeneration phase' of reverse electrodialysis electricity is generated.

Preferably the CDI stack and CDI device comprise a three-way-valve (or two two-way-valves) for controlling the flow of fluid either to a product storage tank or to a drain or a waste liquid storage tank. For a capacitive deionization process at the end of the 'production phase' when the electrodes (c) are almost saturated with ions, the adsorption rate decreases. Then the 'regeneration phase' may start by short circuiting the electrodes (c) while the influent flow is stopped by closing the valve for a certain period of time, preferably for 5 to 120 seconds, e.g. about 20 seconds. As a next step the polarity across the electrodes (c) may be reversed with the valves still closed, expelling the ions from the electrodes (c) into the fluid path, preferably for a period of 4 to 120 seconds, followed by opening the valve to allow the waste fluid to be sent to the drain or to a waste liquid storage tank. Prior to a repeat of the 'production phase' the polarity may be reversed again to the original situation and the waste liquid remaining in the system may be led to the drain or the waste liquid storage tank. By switching the valve to the product storage tank the 'production phase' may start once again.

Optionally the process of the seventh and eighth aspects of the present invention further comprises the step of cleaning the CDI stack, CDI device, the ED stack or ED device ('cleaning phase'). Cleaning can be done by, for example, rinsing the CDI stack, CDI device, ED stack or ED device with a cleaning solution. Preferably the cleaning solution is left in the CDI stack, CDI device, ED stack or ED device (with the valves closed), is pumped through the stack or device at a low flow rate or is recirculated through the stack or device, for a certain period of time, preferably 4 to 60 minutes, e.g. 5 to 15 minutes, to dissolve undesired material that has built up inside the stack or device, i.e. to remove the so-called scaling and (bio)fouling. As cleaning solution acidic solutions are preferred, optionally further comprising a biocidal agent if desired. Preferred cleaning solutions comprise citric acid, formic acid, glycolic acid, hydrochloric acid, sulfamic acid, acetic acid or a combination of two or more thereof. The cleaning solution may further comprise chelating agents such as amino acids, e.g. aspartic acid, glutamic acid, glycine and/or alanine, derivatives thereof, such as trimethylglycine, alpha- or beta-alanine-N,N-diacetic acid, (methyl)glycine-N,N-diacetic acid, aspartic acid N,N-diacetic acid and glutamic acid-N,N-diacetic acid, iminodiacetic acid, nitrilotriacetic acid or combinations comprising two or more thereof. For a CDI stack the cleaning step preferably starts after a regeneration phase. Since gaseous compounds may be formed as a reaction with the acidic compound(s) in the cleaning solution frequent degassing may be desirable, e.g. every one or two minutes during the cleaning step. The cleaning phase typically lasts for 5 minutes to 120 minutes.

The invention claimed is:

1. An electrode unit comprising:
   (a) an electrically non-conductive circumferential housing;
   (b) a current collector;
   (c) an electrode;
   (d) optionally a charge barrier; and
   (e) an electrically conductive connector in electrical contact with the current collector;
   wherein:
   (i) the current collector, the electrode, the charge barrier, when the charge barrier is present, and a part of the electrically conductive connector are located within the circumference of the circumferential housing;
   (ii) the part of the connector which is located within the housing and the current collector each have a main plane and the main plane of the connector is oriented substantially parallel to the main plane of the current collector;
   (iii) the connector extends beyond the housing; and
   (iv) the major cross-sectional area of the part of the connector which is inside the housing is less than 30% of the major cross-sectional area of the current collector.

2. The electrode unit according to claim 1 wherein the connector is adhered to the current collector by means of an electrically conductive adhesive.

3. The electrode unit according to claim 2 wherein the electrically conductive adhesive has an electrical volume resistivity of less than 0.1 ohm·cm.

4. The electrode unit according to claim 2 wherein the electrically conductive adhesive comprises graphite, silver, gold, platinum, palladium, nickel, tin, indium, copper, aluminum, carbon nanotubes, carbon black, graphene, polyaniline, poly(3,4-ehtylenedioxythiophene) or a combination comprising two or more thereof.

5. The electrode unit according to claim 2 wherein the electrically conductive adhesive comprises particles having a flake shape, a spherical shape, a needle shape, a dendrite shape or comprises a combination two or more of such particles.

6. The electrode unit according to claim 2 wherein the connector is at least partly covered at a side opposite to the electrically conductive adhesive by a protective coating and/or a protective film.

7. The electrode unit according to claim 1 wherein the current collector is or comprises carbon.

8. The electrode unit according to claim 1 wherein the electrode is or comprises elemental carbon.

9. The electrode unit according to claim 1 wherein the connector comprises carbon, silver, gold, aluminum, platinum or copper.

10. The electrode unit according to claim 1 wherein the volume resistivity of the electrically conductive connector is at most 10% of the volume resistivity of the current collector.

11. The electrode unit according to claim 1 wherein the thickness of the part of the connector which is inside the housing is less than its width.

12. The electrode unit according to claim 1 wherein the connector has a thickness of between 5 and 600 µm or the connector has a width of between 1 and 30 mm or the connector has a thickness of between 5 and 600 µm and a width of between 1 and 30 mm.

13. The electrode unit according to claim 1 wherein the width/thickness ratio of the part of the connector which is inside the housing is larger than 2 and smaller than 5000.

14. An electrode-spacer composite comprising an electrode unit according to claim 1 and a spacer, wherein the spacer abuts the electrically non-conductive circumferential housing and the spacer comprises a gasket which defines the side walls and end walls of a flow compartment.

15. A stack comprising two or more electrode units according to claim 1.

16. The stack according to claim 15 wherein the electrode units are arranged to be alternately anodic electrode units and alternately cathodic electrode units throughout the stack and wherein the electrode units in the stack are arranged such that the electrically conductive connectors in adjacent electrode units are oriented near opposite edges of the corresponding current collectors.

17. A stack for an electrodialysis or reverse electrodialysis device comprising at least two electrode units as defined in claim 1 and, located between the two electrode units, a membrane stack comprising alternate cation exchange membranes and anion exchange membranes running parallel to the electrode units and flow compartments between said membranes through which fluid may flow.

18. The stack according to claim 17 which is constructed such that fluid will flow through each flow compartment in a different direction to fluid flowing through the adjacent flow compartments.

19. An electrodialysis device or reverse electrodialysis device comprising a stack according to claim 17 comprising gaskets provided by a polymeric gasket or an adhesive.

20. A process for purifying a fluid comprising passing the fluid through a device according to claim 19.

21. A process for generating electricity comprising passing a concentrated ionic solution and a dilute ionic solution through alternate compartments of a reverse electrodialysis device according to claim 19.

22. A device comprising a stack according to claim 17 and an outer casing having fluid inlet(s) and fluid outlet(s), wherein the stack is located within the outer casing.

23. The device according to claim 22 wherein the connectors of the electrode units extend beyond the outer casing.

24. The device according to claim 22 wherein the outer casing acts as component of each electrode unit present in the device.

25. A process for generating electricity comprising passing a concentrated ionic solution and a dilute ionic solution through alternate compartments of a reverse electrodialysis stack according to claim 17.

26. A capacitive deionisation device comprising two or more electrode units according to claim 1.

27. The device according to claim 26 wherein the electrode units are arranged to be alternately anodic electrode units and alternately cathodic electrode units throughout the stack.

28. The device according to claim 26 which further comprises a spacer between each electrode unit and the next electrode unit comprising a gasket which defines the side walls and end walls of a flow compartment, wherein the electrically non-conductive circumferential housing of each electrode unit comprises a fluid inlet and a fluid outlet and the fluid inlets, fluid outlets and flow compartments together define a flow channel through the device through which fluid requiring desalination may pass.

29. A process for purifying a fluid comprising passing the fluid through a device according to claim 26.

30. A stack comprising two or more electrode-spacer composites according to claim 2.

* * * * *